United States Patent
Chikugo

(10) Patent No.: US 10,256,484 B2
(45) Date of Patent: Apr. 9, 2019

(54) FUEL CELL SYSTEM AND METHOD FOR CONTROLLING FUEL CELL SYSTEM

(71) Applicant: NISSAN MOTOR CO., LTD., Yokohama-shi, Kanagawa (JP)

(72) Inventor: Hayato Chikugo, Kanagawa (JP)

(73) Assignee: NISSAN MOTOR CO., LTD., Yokohama-shi (JP)

(*) Notice: Subject to any disclaimer, the term of this patent is extended or adjusted under 35 U.S.C. 154(b) by 0 days.

(21) Appl. No.: 14/902,989

(22) PCT Filed: May 9, 2014

(86) PCT No.: PCT/JP2014/062533
§ 371 (c)(1),
(2) Date: Jan. 5, 2016

(87) PCT Pub. No.: WO2015/001845
PCT Pub. Date: Jan. 8, 2015

(65) Prior Publication Data
US 2016/0197367 A1 Jul. 7, 2016

(30) Foreign Application Priority Data
Jul. 5, 2013 (JP) ................... 2013-142101

(51) Int. Cl.
*H01M 8/04* (2016.01)
*H01M 8/04223* (2016.01)
(Continued)

(52) U.S. Cl.
CPC ..... *H01M 8/04104* (2013.01); *H01M 8/0444* (2013.01); *H01M 8/04223* (2013.01);
(Continued)

(58) Field of Classification Search
CPC ......... H01M 8/04104; H01M 8/04223; H01M 8/04221; H01M 8/04388; H01M 8/04395;
(Continued)

(56) References Cited

U.S. PATENT DOCUMENTS

2001/0016276 A1* 8/2001 Yamanashi ......... B60L 11/1881
429/431
2004/0161643 A1* 8/2004 Uehara ............. H01M 8/04089
429/443
(Continued)

FOREIGN PATENT DOCUMENTS

CN 1787267 * 6/2006 .............. H01M 8/04
CN 102473945 A 5/2012
(Continued)

*Primary Examiner* — Jonathan G Leong
*Assistant Examiner* — Aaron J Greso
(74) *Attorney, Agent, or Firm* — Foley & Lardner LLP

(57) ABSTRACT

A fuel cell system supplies anode gas and cathode gas to a fuel cell and generates electric power in accordance with a load. The fuel cell system configured to include a cathode gas control unit controls a pressure of the cathode gas on the basis of the load, an anode gas control unit configured to cause a pressure of the anode gas to pulsate on the basis of the pressure of the cathode gas and a pulsation amplitude. The pulsation amplitude is determined on the basis of an operating condition of the fuel cell. The fuel cell system includes an anode gas partial pressure maintenance control unit configured to increase the pressure of the anode gas in accordance with a condition of an impurity within the fuel cell. The cathode gas control unit configured to make the pressure of the cathode gas higher when a pressure difference between the pressure of the anode gas and the pressure of the cathode gas is large than when the pressure difference is small.

15 Claims, 10 Drawing Sheets

(51) Int. Cl.
    *H01M 8/0444*      (2016.01)
    *H01M 8/04089*      (2016.01)
    *H01M 8/0438*      (2016.01)
    *H01M 8/04537*      (2016.01)
    *H01M 8/04664*      (2016.01)
    *H01M 8/04746*      (2016.01)
    *H01M 8/1018*      (2016.01)

(52) U.S. Cl.
    CPC ... *H01M 8/04231* (2013.01); *H01M 8/04388* (2013.01); *H01M 8/04395* (2013.01); *H01M 8/04619* (2013.01); *H01M 8/04679* (2013.01); *H01M 8/04753* (2013.01); *H01M 2008/1095* (2013.01)

(58) Field of Classification Search
    CPC ........... H01M 8/0444; H01M 8/04619; H01M 8/04679; H01M 8/04753; H01M 2008/1095
See application file for complete search history.

(56) References Cited

U.S. PATENT DOCUMENTS

| | | |
|---|---|---|
| 2007/0054167 A1 | 3/2007 | Ueda et al. |
| 2010/0190080 A1* | 7/2010 | Hasuka ............ H01M 8/04097 429/446 |
| 2012/0107711 A1* | 5/2012 | Tomita ............ H01M 8/04388 429/446 |
| 2013/0149627 A1 | 6/2013 | Nishimura et al. |
| 2013/0164649 A1 | 6/2013 | Nishimura et al. |

FOREIGN PATENT DOCUMENTS

| | | | |
|---|---|---|---|
| CN | 103098280 A | 5/2013 | |
| JP | 2005-243476 A | 9/2005 | |
| WO | WO 2011/004780 A1 | 1/2011 | |
| WO | WO 2012/033003 A1 | 3/2012 | |
| WO | WO 2012/053324 A1 | 4/2012 | |
| WO | WO 2013/149337 | * 10/2013 | .............. H01M 8/04 |

* cited by examiner

FUEL CELL SYSTEM AND METHOD FOR CONTROLLING FUEL CELL SYSTEM

TECHNICAL FIELD

The present invention relates to a fuel cell system for causing anode gas supplied to fuel cells to pulsate, and also relates to a method of controlling the fuel cell system.

BACKGROUND ART

Some fuel cell systems perform a pulsation operation of causing the pressure of anode gas to pulsate in order to discharge impurities, such as water vapor produced through generation of electric power and nitrogen in the air, from fuel cells (see JP 2005-243476A).

SUMMARY OF INVENTION

Currently, a fuel cell system has been developed that performs a pulsation operation of causing the pressure of anode gas to pulsate with a desired pulsation amplitude corresponding to an operating condition of fuel cells. Specifically, in order to prevent deterioration in electrolyte membranes caused by an interelectrode pressure difference between the pressure of anode gas and the pressure of cathode gas, a pulsation lower limit pressure of anode gas is set to have the same value as the pressure of cathode gas, and a pulsation upper limit pressure of anode gas is set to a sum of the pulsation lower limit pressure and the pulsation amplitude.

In such a fuel cell system, if the temperature of the fuel cells increases during, for example, a high-load operation, a partial pressure of water vapor within anode gas flow passages of the fuel cells increases. This leads to a relative decrease in a partial pressure (concentration) of hydrogen in anode gas, and hence a decrease in the efficiency of electric power generation by the fuel cells. To address such issues, electric power that is required to be generated by the fuel cells is secured by making the pulsation lower limit pressure higher than the pressure of cathode gas in response to an increase in the partial pressure of water vapor, and the pulsation amplitude of anode gas can be secured by increasing the pulsation upper limit pressure in response to an increase in the pulsation lower limit pressure.

However, when the pulsation upper limit pressure is increased with an increase in the partial pressure of water vapor, there are cases where the pulsation upper limit pressure is suppressed so as not to exceed an allowable pressure difference in the electrolyte membranes. In such cases, the pulsation amplitude is reduced, the performance of discharge of impurities within the fuel cells is lowered, and thus the efficiency of electric power generation by the fuel cells drops.

If the pulsation lower limit pressure is reduced without increasing the pulsation upper limit pressure in order to secure the pulsation amplitude, the performance of discharge of impurities can be secured, but it is difficult to secure a required electric power because the overall pressure of anode gas decreases.

The present invention has been made with a focus on the above problems, and aims to provide a fuel cell system that can ensure both a pulsation amplitude of the pressure of anode gas and a required electric power, and a method of controlling such a fuel cell system.

According to one aspect of the present invention, a fuel cell system is configured to supply anode gas and cathode gas to a fuel cell and generate electric power in accordance with a load. The fuel cell system includes a cathode gas control unit configured to control a pressure of the cathode gas on the basis of the load, an anode gas control unit configured to cause a pressure of the anode gas to pulsate on the basis of the pressure of the cathode gas and a pulsation amplitude. The pulsation amplitude is determined on the basis of an operating condition of the fuel cell. The fuel cell system includes an anode gas partial pressure maintenance control unit configured to increase the pressure of the anode gas in accordance with a condition of an impurity within the fuel cell. The cathode gas control unit is configured to make the pressure of the cathode gas higher when a pressure difference between the pressure of the anode gas and the pressure of the cathode gas is large than when the pressure difference is small.

DESCRIPTION OF EMBODIMENTS

The following describes an embodiment of the present invention with reference to the attached drawings.

First Embodiment

Figure 1:
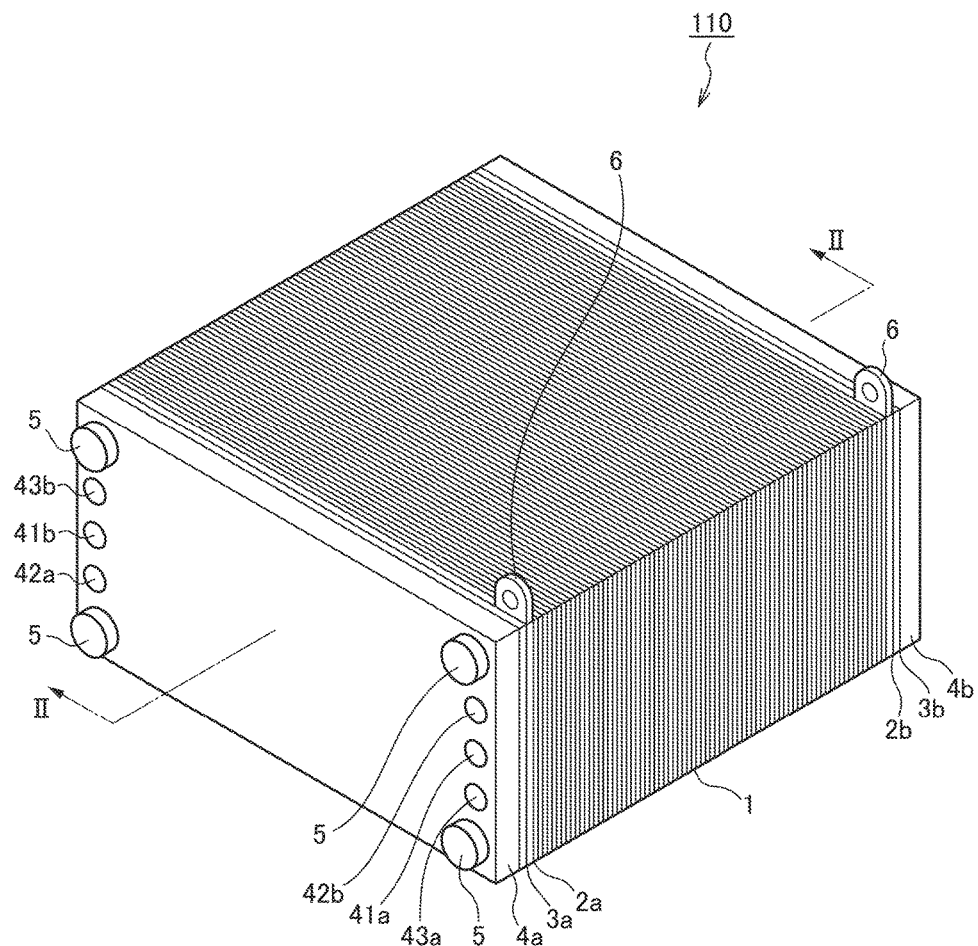
FIG. 1 is a perspective view showing an external appearance of a fuel cell stack.

FIG. 1 is a perspective view showing an example of a fuel cell stack used in a fuel cell system according to a first embodiment of the present invention.

In the present embodiment, a fuel cell stack 110 is used as a power supply that supplies electric power to a driving motor for driving a vehicle. The fuel cell stack 110 is made by stacking a plurality of fuel cells.

A fuel cell includes an anode electrode (so-called fuel electrode), a cathode electrode (so-called oxidant electrode), and an electrolyte membrane interposed between such electrodes. Herein, each one of the plurality of fuel cells that are stacked to form the fuel cell stack 110 is referred to as a "single cell".

Each fuel cell generates electric power using anode gas (so-called fuel gas) containing hydrogen, which is supplied to the anode electrode, and cathode gas (so-called oxidant gas) containing oxygen, which is supplied to the cathode electrode. Electrochemical reactions progress in the anode electrode and the cathode electrode of each fuel cell as follows.

Anode electrode: $2H_2 \rightarrow 4H^+ + 4e^-$  (1)

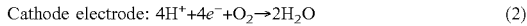

Cathode electrode: $4H^+ + 4e^- + O_2 \rightarrow 2H_2O$  (2)

The fuel cell stack 110 includes a plurality of single cells 1, a pair of current collector plates 2a and 2b, a pair of insulating plates 3a and 3b, a pair of end plates 4a and 4b, and nuts 5 that are screwed to four tension rods (not shown).

Each single cell 1 is a solid polymer fuel cell, and generates an electromotive voltage of approximately one volt. The structure of each single cell 1 will be described later with reference to FIG. 2.

The pair of current collector plates 2a and 2b is disposed on the outer sides of the plurality of stacked single cells 1. The current collector plates 2a and 2b are made of a gas impermeable, electrically conductive material, such as dense carbon. Each of the current collector plates 2a and 2b has an output terminal 6 located on a portion of an upper side thereof. In the fuel cell stack 110, electrons $e^-$ generated by each single cell 1 are extracted from the output terminals 6.

The pair of insulating plates 3a and 3b is disposed on the outer sides of the current collector plates 2a and 2b. The insulating plates 3a and 3b are made of an insulating material, such as rubber.

The pair of end plates 4a and 4b is disposed on the outer sides of the insulating plates 3a and 3b. The end plates 4a and 4b are made of a stiff metallic material, such as steel.

An inlet hole 41a and an outlet hole 41b for cooling water, an inlet hole 42a and an outlet hole 42b for anode gas, and an inlet hole 43a and an outlet hole 43b for cathode gas are formed in one end plate 4a among the pair of end plates 4a and 4b. Note that the cooling water inlet hole 41a, the anode gas outlet hole 42b, and the cathode gas inlet hole 43a are formed at one end (the right side in FIG. 1) of the end plate 4a, whereas the cooling water outlet hole 41b, the anode gas inlet hole 42a, and the cathode gas outlet hole 43b are formed at the other end (the left side in FIG. 1) of the end plate 4a.

Hydrogen can be supplied to the anode gas inlet hole 42a, for example, by directly supplying hydrogen gas from a hydrogen reservoir apparatus, or by supplying reformed fuel containing hydrogen as gas containing hydrogen. Note that examples of the hydrogen reservoir apparatus include a high pressure gas tank, a liquid hydrogen tank, and a hydrogen storage alloy tank. Possible examples of fuel gas containing hydrogen include natural gas, methanol, and gasoline. Air is commonly used as oxidant gas supplied to the cathode gas inlet hole 43a.

The nuts 5 are screwed to male thread parts that are formed at both ends of the four tension rods (not shown) passing through the inside of the fuel cell stack 110. Screwing and fastening the nuts 5 to the tension rods clamps the fuel cell stack 110 in a stacking direction. The tension rods are made of a stiff metallic material, such as steel. Insulation treatment has been applied to the surfaces of the tension rods so as to prevent a short circuit between the single cells 1.

Figure 2:
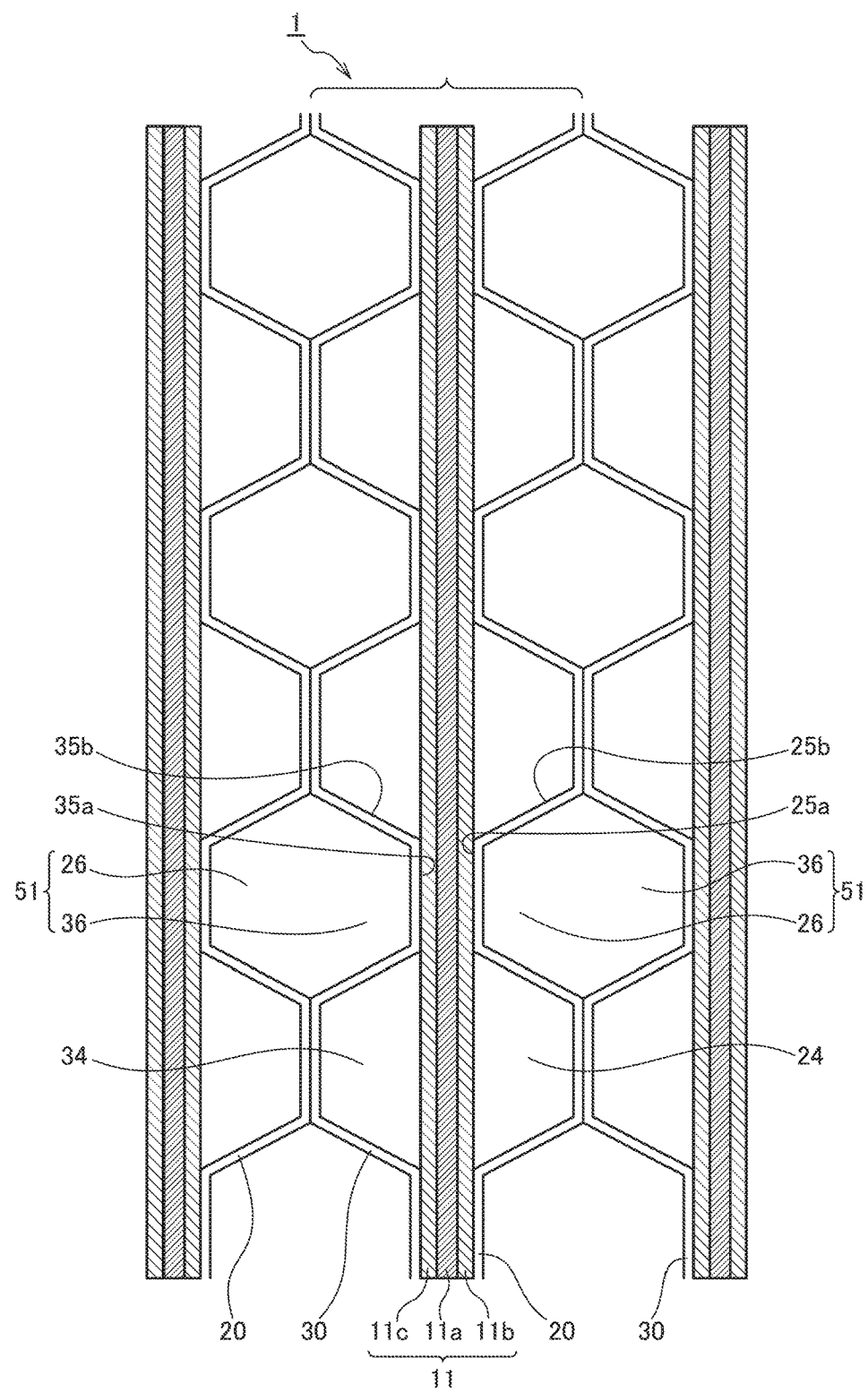
FIG. 2 is a cross-sectional view showing a single cell of the fuel cell stack.

FIG. 2 shows a part of a cross-section of the single cells 1 as viewed from a direction along the line II-II of FIG. 1.

Each single cell 1 is configured such that a membrane electrode assembly (hereinafter "MEA") 11 is held between an anode separator 20 and a cathode separator 30.

The MEA 11 includes an electrolyte membrane 11a, an anode electrode 11b, and a cathode electrode 11c. In the MEA 11, the anode electrode 11b is placed on one surface of the electrolyte membrane 11a, whereas the cathode electrode 11c is placed on the other surface of the electrolyte membrane 11a.

The electrolyte membrane 11a is a proton-conducting ion-exchange membrane made of fluororesin. The electrolyte membrane 11a demonstrates favorable electrical conductivity in a moist condition.

The anode electrode 11b and the cathode electrode 11c are each composed of a gas diffusion layer, a water repellent layer, and a catalyst layer. The gas diffusion layers are made of a material with sufficient gas diffusivity and electrical conductivity, such as a carbon cloth woven with carbon fiber threads. The water repellent layers contain polyethylene-fluoroethylene and a carbon material. The catalyst layers are made of carbon black particles on which platinum is supported.

The anode separator 20 is in contact with the anode electrode 11b. The anode separator 20 has anode gas flow passages 24, through which anode gas is supplied to the anode electrode 11b, on a side that is in contact with the anode electrode 11b. The anode separator 20 also has cooling water flow passages 26, in which cooling water for cooling the fuel cell stack 110 flows, on surfaces opposite to surfaces 25a that are in direct contact with the anode electrode 11b (later-described top surfaces of flow passage ribs 25).

Similarly, the cathode separator 30 has cathode gas flow passages 34, through which cathode gas is supplied to the cathode electrode 11c, on a side that is in contact with the cathode electrode 11c, and has cooling water flow passages 36 on surfaces opposite to surfaces 35a that are in contact with the cathode electrode 11c (later-described top surfaces of flow passage ribs 35). The anode separator 20 and the cathode separator 30 are made of metal or carbon.

Note that the cooling water flow passage 26 and the cooling water flow passage 36 formed by the anode separator 20 and the cathode separator 30 that neighbor each other are arranged to face each other, and constitute a single cooling water flow passage 51.

Anode gas in the gas flow passages 24 and cathode gas in the gas flow passages 34 flow in the opposite directions with the MEA 11 therebetween. In the present embodiment, anode gas in the gas flow passages 24 flows from the back to the front of the sheet of FIG. 2, whereas cathode gas in the gas flow passages 34 flows from the front to the back of the sheet of FIG. 2.

Figure 3:
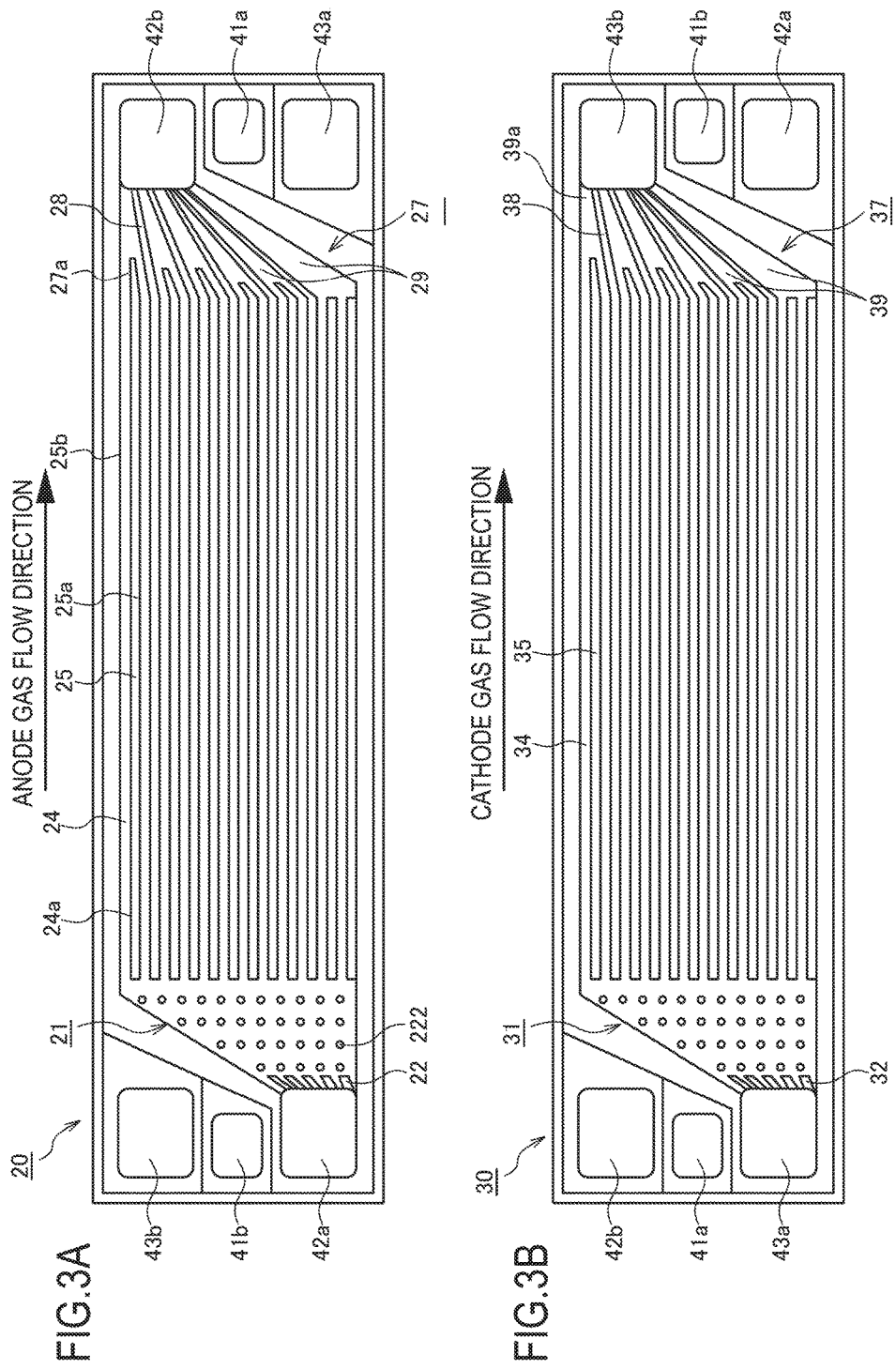
FIG. 3A is a plan view showing an anode separator composing a fuel cell.
FIG. 3B is a plan view showing a cathode separator composing the fuel cell.

FIG. 3A is a plan view of the anode separator 20 as viewed from an anode electrode.

The cathode gas outlet hole 43b, the cooling water outlet hole 41b, and the anode gas inlet hole 42a are formed at one end (the left side in FIG. 3A) of the anode separator 20, in this order from the top. On the other hand, the anode gas outlet hole 42b, the cooling water inlet hole 41a, and the cathode gas inlet hole 43a are formed at the other end (the right side in FIG. 3A) of the anode separator 20, in this order from the top.

In addition, an anode gas diffusion part 21, a plurality of anode gas flow passages 24 in the form of grooves, and an anode gas merging part 27 are formed on a surface of the anode separator 20. Herein, the anode gas flow passages 24 are simply referred to as gas flow passages 24".

The gas flow passages 24 are each formed between flow passage ribs 25 that project from bottom surfaces 24a of the gas flow passages 24 toward the anode electrode and that are in contact with the anode electrode. Note that the back surfaces of the flow passage ribs 25 form the cooling water flow passages 26 described earlier. Side surfaces 25b of the flow passage ribs 25 are tapered, that is to say, inclined at a constant angle from the top surfaces 25a of the flow passage ribs 25 toward the bottom surfaces 24a of the gas flow passages 24. In this way, excess turbulence of gas flowing in the gas flow passages 24 and cooling water flowing in the cooling water flow passages 26 is suppressed, thereby reducing a pressure loss.

The anode gas diffusion part 21 is formed between the anode gas inlet hole 42a and the gas flow passages 24. The anode gas diffusion part 21 is a gas flow passage that increases in width from the anode gas inlet hole 42a toward the gas flow passages 24.

A plurality of lattice-shaped protrusions, or diffusion ribs 22, are formed in the anode gas diffusion part 21 so as to evenly distribute anode gas to each gas flow passage 24. The diffusion ribs 22 project from a bottom surface 21a of the anode gas diffusion part 21 toward the anode electrode, and are in contact with the anode electrode.

The anode gas merging part 27 is formed between the gas flow passages 24 and the anode gas outlet hole 42b. The anode gas merging part 27 is a gas flow passage that decreases in width from the gas flow passages 24 toward the anode gas outlet hole 42b.

A plurality of merging ribs 28 are formed in the anode gas merging part 27. The merging ribs 28 project from a bottom surface 27a of the anode gas merging part 27 toward the anode electrode, and are in contact with the anode electrode. The anode gas merging part 27 is divided into a plurality of regions 29 by the merging ribs 28. These divided regions 29 are hereinafter referred to as "gas merging flow passages 29".

The merging ribs 28 are formed in such a manner that they extend beyond trailing ends of the gas flow passages 24 toward the anode gas outlet hole 42b. With the merging ribs 28, the gas merging flow passages 29 decrease in width toward the anode gas outlet hole 42b. In addition, with the merging ribs 28, gas flows from the gas flow passages 24 into each gas merging flow passage 29 at substantially the same flow rate. The number of the merging ribs 28 is smaller than the number of the flow passage ribs 25. Note that trailing ends of some of the flow passage ribs 25 are elongated until the flow passage width of neighboring gas merging flow passages 29 becomes substantially equal to the flow passage width of the gas flow passages 24.

FIG. 3B is a plan view of the cathode separator 30 as viewed from the cathode electrode 11c.

The cathode separator 30 is configured in a manner similar to an anode separator 20. The cathode separator 30 includes a cathode gas diffusion part 31, cathode gas flow passages 34, flow passage ribs 35, and a cathode gas merging part 37. Herein, the cathode gas flow passages 34 are simply referred to as "gas flow passages 34".

Diffusion ribs 32 are provided in the cathode gas diffusion part 31. In the cathode gas merging part 37, merging ribs 38 are provided to form gas merging flow passages 39.

As the cathode separator 30 opposes the anode separator 20 via the MEA 11, one end (the left side in FIG. 3B) of the cathode separator 30 corresponds to the other end (the right side in FIG. 3A) of the anode separator 20. On the other hand, the other end (the right side in FIG. 3B) of the cathode separator 30 corresponds to one end (the left side in FIG. 3A) of the anode separator 20.

Therefore, the anode gas outlet hole 42b, the cooling water inlet hole 41a, and the cathode gas inlet hole 43a are formed at one end (the left side in FIG. 3B) of the cathode separator 30 in correspondence with the three holes formed at the other end of the anode separator 20. On the other hand, the cathode gas outlet hole 43b, the cooling water outlet hole 41b, and the anode gas inlet hole 42a are formed at the other end (the right side in FIG. 3B) of the cathode separator 30 in correspondence with the three holes formed at one end of the anode separator 20.

Figure 4:
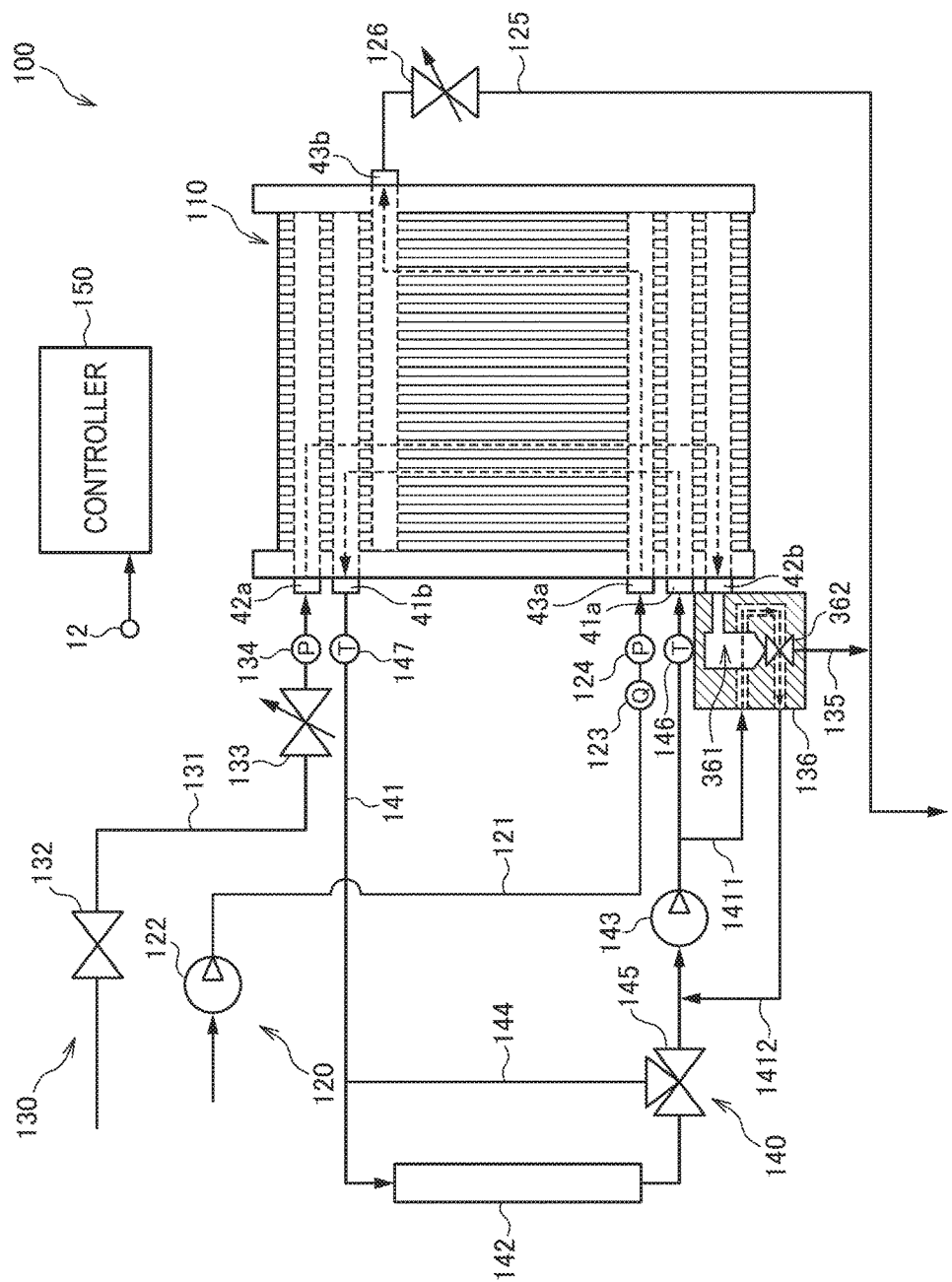
FIG. 4 shows a configuration of a fuel cell system according to an embodiment of the present invention.

FIG. 4 shows a configuration of a fuel cell system 100 according to the embodiment of the present invention.

The fuel cell system 100 is a power supply system for causing the fuel cells to generate electric power in accordance with loads by supplying fuel gas necessary for the electric power generation from the outside to the fuel cells. In the present embodiment, the fuel cell system 100 supplies electric power to, for example, the driving motor for driving the vehicle.

The fuel cell system 100 includes the fuel cell stack 110, a cathode gas supply/discharge apparatus 120, an anode gas supply/discharge apparatus 130, a stack cooling apparatus 140, and a controller 150.

The fuel cell stack 110 generates a voltage of, for example, several hundred volts (V). The fuel cell stack 110 is connected to the driving motor and auxiliary machines for the fuel cell system 100. The stacked single cells 1 of the fuel cell stack 110 are connected in series. Thus, a sum total of cell voltages generated by the single cells 1 is the voltage output for the loads.

The cathode gas supply/discharge apparatus 120 and the anode gas supply/discharge apparatus 130 supply cathode gas and anode gas, respectively, to the fuel cell stack 110.

The cathode gas supply/discharge apparatus 120 supplies cathode gas to the fuel cell stack 110, and discharges cathode gas discharged from the fuel cell stack 110 to the open air.

The cathode gas supply/discharge apparatus 120 includes a cathode gas supply passage 121, a cathode compressor 122, a cathode flow rate sensor 123, a cathode pressure sensor 124, a cathode gas discharge passage 125, and a cathode pressure regulator valve 126.

Cathode gas is supplied to the fuel cell stack 110 through the cathode gas supply passage 121. One end of the cathode gas supply passage 121 communicates with a passage for taking in the outer air. The other end of the cathode gas supply passage 121 is connected to the cathode gas inlet hole 43a.

The cathode compressor 122 is a pump for supplying cathode gas to the fuel cell stack 110. The cathode compressor 122 is provided in the cathode gas supply passage 121. The cathode compressor 122 takes air containing oxygen into the cathode gas supply passage 121, and supplies the air as cathode gas to the fuel cell stack 110.

The cathode flow rate sensor 123 is provided in the cathode gas supply passage 121. The cathode flow rate sensor 123 detects the flow rate of cathode gas supplied to the fuel cell stack 110 (hereinafter "cathode flow rate"). The cathode flow rate sensor 123 outputs a detected value to the controller 150. The value detected by the cathode flow rate sensor 123 is used in, for example, controlling an operation amount of the cathode compressor 122.

The cathode pressure sensor 124 is provided in the cathode gas supply passage 121 in such a manner that it is located downstream relative to the cathode compressor 122. The cathode pressure sensor 124 detects the pressure of cathode gas supplied to the fuel cell stack 110 (hereinafter "stack inlet cathode pressure", or simply "cathode pressure"). The cathode pressure sensor 124 outputs a detected value to the controller 150. The value detected by the cathode pressure sensor 124 is used in, for example, controlling an operation amount of the cathode compressor 122.

Cathode gas is discharged from the fuel cell stack 110 through the cathode gas discharge passage 125. One end of the cathode gas discharge passage 125 is connected to the cathode gas outlet hole 43b. The other end of the cathode gas discharge passage 125 is open.

The cathode pressure regulator valve 126 is provided in the cathode gas discharge passage 125. The controller 150 controls the cathode pressure regulator valve 126 to open or close. Through this open/close control, cathode gas supplied to the fuel cell stack 110 is adjusted to a desired pressure.

The anode gas supply/discharge apparatus 130 supplies anode gas to the fuel cell stack 110, and discharges impurities retained in the fuel cell stack 110 to the cathode gas discharge passage.

The anode gas supply/discharge apparatus 130 includes an anode gas supply passage 131, a shutoff valve 132, an anode pressure regulator valve 133, and an anode pressure sensor 134. The anode gas supply/discharge apparatus 130 also includes an anode gas discharge passage 135 and a water reserving buffer 136.

Anode gas is supplied to the fuel cell stack 110 through the anode gas supply passage 131. One end of the anode gas supply passage 131 is connected to, for example, a high-pressure tank filled with anode gas. The other end of the anode gas supply passage 131 is connected to the anode gas inlet hole 42a.

The shutoff valve 132 is provided in the anode gas supply passage 131. The shutoff valve 132 shuts off anode gas supplied to the fuel cell stack 110. The controller 150 controls the shutoff valve 132 to open or close. The shutoff valve 132 opens and closes when the fuel cell system 100 is activated and deactivated, respectively.

The anode pressure regulator valve 133 is provided in the anode gas supply passage 131 in such a manner that it is located downstream relative to the shutoff valve 132. The controller 150 controls the anode pressure regulator valve 133 to open or close. Through this open/close control, anode gas supplied to the fuel cell stack 110 is adjusted to a predetermined pressure on the basis of electric power that is required to be generated by the fuel cells (required electric power).

The anode pressure sensor 134 is provided in the anode gas supply passage 131 in such a manner that it is located between the anode pressure regulator valve 133 and the anode gas inlet hole 42a. The anode pressure sensor 134 detects the pressure of anode gas supplied to the fuel cell stack 110 (hereinafter "stack inlet anode pressure", or simply "anode pressure"). The anode pressure sensor 134 outputs a detected value to the controller 150. The value detected by the anode pressure sensor 134 is used in, for example, adjusting the opening degree of the anode pressure regulator valve 133.

Impurities contained in anode gas are discharged from the fuel cell stack 110 through the anode gas discharge passage 135. One end of the anode gas discharge passage 135 merges with the cathode gas discharge passage 125. The other end of the anode gas discharge passage 135 is connected to an outlet hole of the water reserving buffer 136.

The water reserving buffer 136 is provided at the anode gas outlet hole 42b. Note that in the present embodiment, the water reserving buffer 136 is connected directly to the anode gas outlet hole 42b. Alternatively, a passage connecting the anode gas outlet hole 42b and the cathode gas discharge passage 125 may be provided in place of the anode gas discharge passage 135, and the water reserving buffer 136 may be provided in the connecting passage.

Anode gas discharged from the anode gas outlet hole 42b contains not only residual anode gas that has not been used for the reaction of electric power generation, but also impurities. Examples of such impurities include nitrogen, which is inert gas, contained in cathode gas, and water vapor produced through the reaction of electric power generation.

When the anode gas outlet hole 42b temporarily discharges condensed water at a flow rate exceeding the water discharge performance of a later-described purge valve 362, the water reserving buffer 136 exerts a function of preventing a reverse flow of the condensed water into the anode gas outlet hole 42b.

The anode gas discharge passage 135 is provided with the purge valve 362 for discharging nitrogen, water vapor, and condensed water contained in anode gas within the fuel cell stack 110 to the cathode gas discharge passage 125.

The purge valve 362 discharges anode gas containing nitrogen retained in a capacity part 361 to the cathode gas discharge passage 125. Consequently, hydrogen in anode gas is diluted by cathode gas. The controller 150 controls the purge valve 362 to open or close. Through this open/close control, the concentration of hydrogen at an exit end of the cathode gas discharge passage 125 is maintained at a prescribed value or lower.

The stack cooling apparatus 140 cools the fuel cell stack 110 and the water reserving buffer 136 using a refrigerant. In the present embodiment, cooling water is used as the refrigerant.

The stack cooling apparatus 140 includes a cooling water circulation passage 141, a heat exchanger 142, a cooling water pump 143, a bypass flow passage 144, a thermostat 145, water temperature sensors 146 and 147, a branch passage 1411, and a merging passage 1412.

Cooling water for the fuel cell stack 110 circulates through the cooling water circulation passage 141.

The heat exchanger 142 is provided in the cooling water circulation passage 141. With the use of a fan or the like, the heat exchanger 142 cools cooling water that has been warmed by the fuel cell stack 110.

The cooling water pump 143 is provided in the cooling water circulation passage 141. The cooling water pump 143 ejects cooling water that has been cooled by the heat exchanger 142 into the fuel cell stack 110. The controller 150 controls the flow rate of cooling water ejected by the cooling water pump 143.

The bypass flow passage 144 branches off from a portion of the cooling water circulation passage 141 located downstream relative to the fuel cell stack 110, and merges with a portion of the cooling water circulation passage 141 located upstream relative to the cooling water pump 143.

The thermostat 145 is provided at the portion with which the bypass flow passage 144 merges. The thermostat 145 controls the flow rate of cooling water supplied to the bypass flow passage 144 and the heat exchanger 142. Consequently, the temperature of cooling water supplied to the cooling water pump 143 can be controlled. Specifically, control is performed so that the lower the temperature of cooling water, the higher the flow rate of cooling water flowing in the bypass flow passage 144.

The water temperature sensor 146 is provided in the cooling water circulation passage 141 near the inlet hole 41a. The water temperature sensor 146 detects the temperature of cooling water flowing into the fuel cell stack 110 (hereinafter "stack inlet water temperature"). The water temperature sensor 146 outputs a detected value to the controller 150.

The water temperature sensor 147 is provided in the cooling water circulation passage 141 near the outlet hole 41*b*. The water temperature sensor 147 detects the temperature of cooling water discharged from the fuel cell stack 110 (hereinafter "stack outlet water temperature"). The water temperature sensor 147 outputs a detected value to the controller 150.

The branch passage 1411 branches off from a portion of the cooling water circulation passage 141 located downstream relative to the cooling water pump 143, so as to make cooling water flow in the water reserving buffer 136 and around the purge valve 362. Thus, cooling water that has been warmed by the fuel cell stack 110 due to a warm-up operation (warm-up driving) of the fuel cell stack 110 flows in an internal passage that passes through the water reserving buffer 136 and the purge valve 362.

Consequently, the water reserving buffer 136 and the purge valve 362 are warmed as well. This can prevent freezing of condensed water that has attached to the purge valve 362 under a below-zero environment. Note that the bypass flow passage 144 may be provided with a heater that heats cooling water so as to warm up the water reserving buffer 136 and the purge valve 362.

The merging passage 1412 extends from the internal passage of the water reserving buffer 136 and the purge valve 362, and merges with a portion of the cooling water circulation passage 141 located upstream relative to the cooling water pump 143.

The controller 150 is composed of a microcomputer provided with a central processing unit (CPU), a read-only memory (ROM), a random-access memory (RAM), and an input/output (I/O) interface. An atmospheric pressure sensor 12 that detects the atmospheric pressure inputs a detected value to the controller 150.

The controller 150 obtains values detected by the atmospheric pressure sensor 12, the cathode pressure sensor 124, the anode pressure sensor 134, and the water temperature sensors 146 and 147. Using these detected values, instruction values (set values), and the like, the controller 150 controls the cathode compressor 122, the cathode pressure regulator valve 126, the anode pressure regulator valve 133, the cooling water pump 143, and the purge valve 362.

Figure 5:
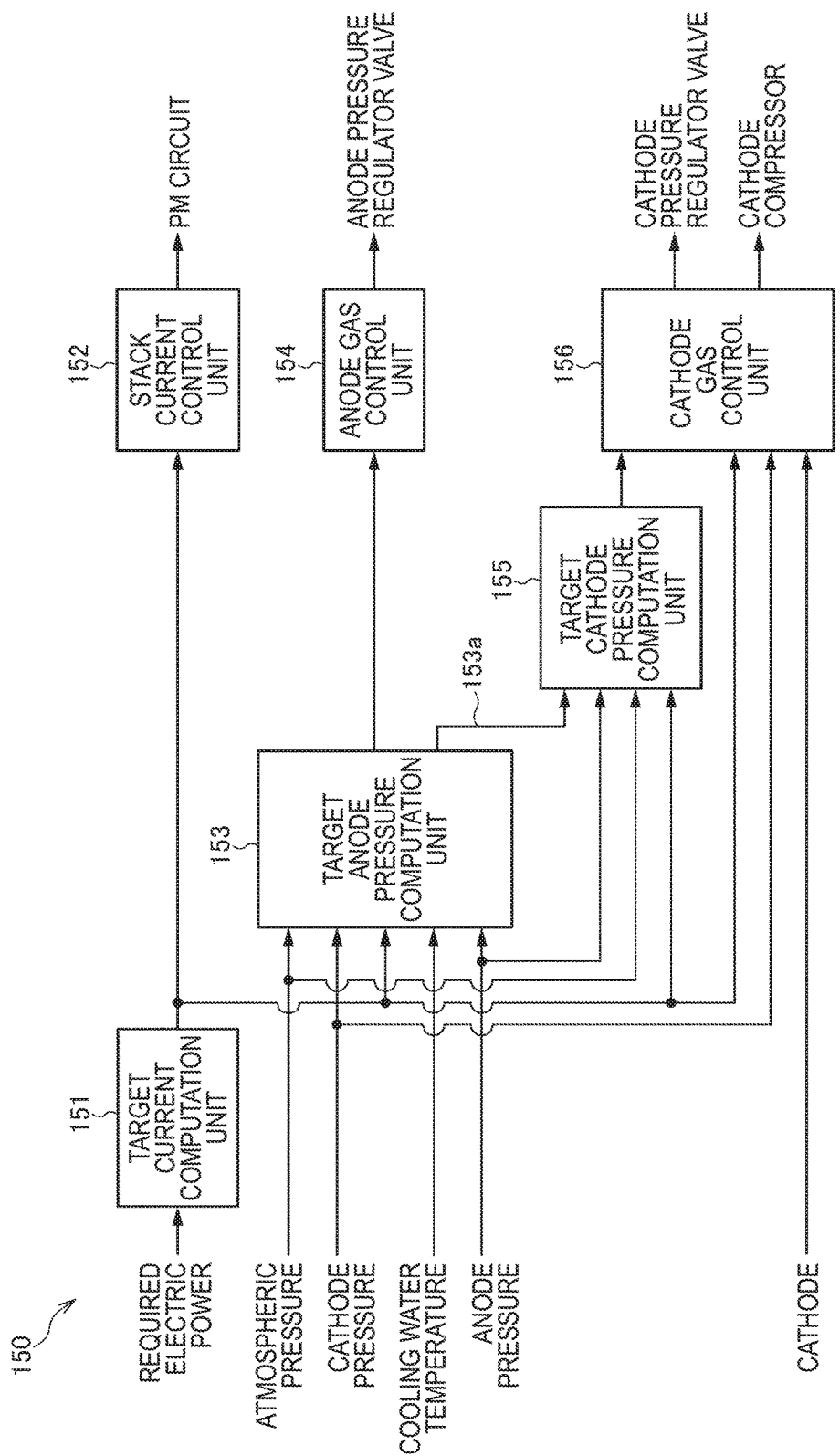
FIG. 5 is a block diagram showing a configuration of a controller.

FIG. 5 is a block diagram showing a functional configuration of the controller 150.

The controller 150 includes a target current computation unit 151, a stack current control unit 152, a target anode pressure computation unit 153, an anode gas control unit 154, a target cathode pressure computation unit 155, and a cathode gas control unit 156.

The target current computation unit 151 computes a target value of current to be extracted through electric power generation by the fuel cell stack 110 (hereinafter "target current") on the basis of a required electric power, i.e., electric power required by the loads, such as the driving motor and auxiliary machines.

For example, reference information indicating the current-voltage characteristic (I-V characteristic) of the fuel cell stack 110 is recorded in the target current computation unit 151. Upon receiving a required electric power based on the loads, the target current computation unit 151 refers to the reference information and computes a target current that can secure the required electric power. The target current computation unit 151 outputs the target current obtained as a result of computation to the stack current control unit 152. The target current is also input to the target anode pressure computation unit 153, the target cathode pressure computation unit 155, and the cathode gas control unit 156.

The stack current control unit 152 controls a power management (PM) circuit on the basis of the target current. The PM circuit is, for example, a DC-to-DC converter connected to a battery. The PM circuit controls the voltage output from the fuel cell stack 110, which is connected at the opposite side of the battery, so that the current supplied from the fuel cell stack 110 to the driving motor is adjusted to the target current.

The target anode pressure computation unit 153 causes the pressure of anode gas to pulsate on the basis of the pressure of cathode gas supplied to the fuel cell stack 110 (cathode pressure) and a pulsation amplitude necessary for the discharge of impurity gases within the fuel cell stack 110. The pulsation amplitude is a value defined on the basis of an operating condition of the fuel cell stack 110. The target anode pressure computation unit 153 also increases the pulsating pressure of anode gas in accordance with the conditions of partial pressures of impurities within the fuel cell stack 110.

In the present embodiment, the target anode pressure computation unit 153 computes a target value of the pressure of anode gas (hereinafter "target anode gas pressure") using parameters indicating an operating condition of the fuel cell stack 110. The parameters include the detected values of the atmospheric pressure, the cathode pressure, the temperature of cooling water, and the anode pressure, as well as the target current. A configuration of the target anode pressure computation unit 153 will be described later with reference to FIG. 6.

The target anode pressure computation unit 153 also outputs a value obtained in the course of computation of the target anode gas pressure as information related to the pressure of anode gas to the target cathode pressure computation unit 155. The target anode pressure computation unit 153 outputs the result of computation of the target anode gas pressure to the anode gas control unit 154.

The anode gas control unit 154 controls the opening degree of the anode pressure regulator valve 133 on the basis of the target anode gas pressure. Specifically, in order to switch the anode pressure regulator valve 133 from a fully-closed state to a fully-open state in a predetermined cycle, the anode gas control unit 154 calculates the ratio (duty ratio) of a period of the fully-open state of the anode pressure regulator valve 133 over the predetermined cycle on the basis of the target anode gas pressure, and controls the anode pressure regulator valve 133 to open and close on the basis of the duty ratio. For example, the anode gas control unit 154 makes a period of the fully-open state within the predetermined cycle longer for a higher target anode gas pressure.

The target cathode pressure computation unit 155 controls the pressure of cathode gas on the basis of the target current. In the present embodiment, the target cathode pressure computation unit 155 computes a target value of the pressure of cathode gas (hereinafter "target cathode gas pressure") using the information related to the pressure of anode gas from the target anode pressure computation unit 153, the target current, and the detected values of the atmospheric pressure and the anode pressure.

The target cathode pressure computation unit 155 outputs the result of computation of the target cathode gas pressure to the cathode gas control unit 156. A configuration of the target cathode pressure computation unit 155 will be described later with reference to FIG. 8.

The cathode gas control unit 156 calculates a target value of the flow rate of cathode gas (hereinafter "target cathode gas flow rate") using the target cathode gas pressure, the target current, and the detected values of the cathode pressure and the cathode flow rate.

On the basis of the target cathode gas flow rate and the target cathode gas pressure, the cathode gas control unit 156 controls the opening degree of the cathode pressure regulator valve 126 and torque of the cathode compressor 122.

Figure 6:
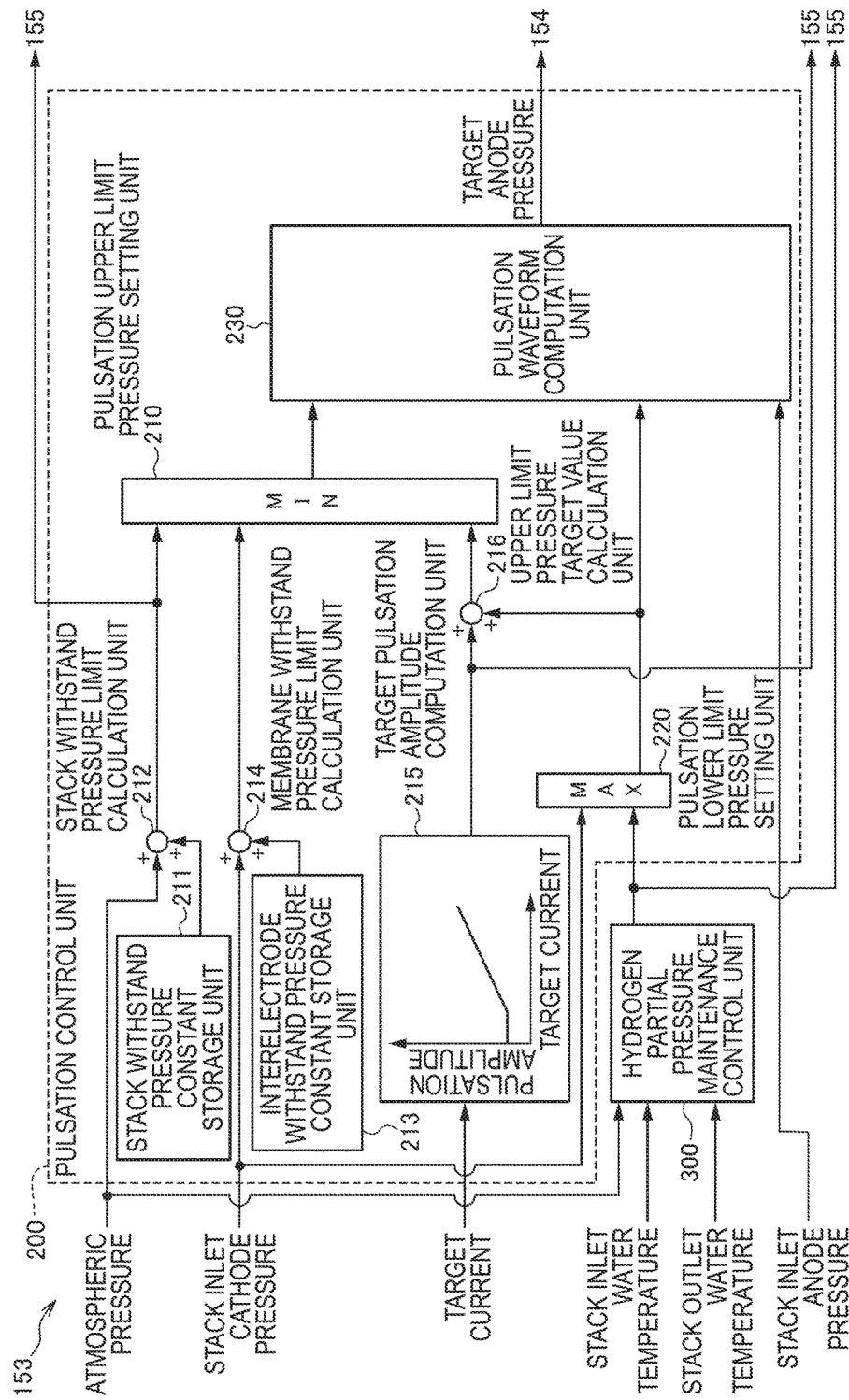
FIG. 6 is a block diagram showing a configuration of a target anode pressure computation unit.

FIG. 6 is a block diagram showing a detailed configuration of the target anode pressure computation unit 153.

The target anode pressure computation unit 153 includes a pulsation control unit 200 and a hydrogen partial pressure maintenance control unit 300.

The pulsation control unit 200 includes a stack withstand pressure constant storage unit 211, a stack withstand pressure limit calculation unit 212, an interelectrode withstand pressure constant storage unit 213, a membrane withstand pressure limit calculation unit 214, a target pulsation amplitude computation unit 215, and an upper limit pressure target value calculation unit 216. The pulsation control unit 200 also includes a pulsation upper limit pressure setting unit 210, a pulsation lower limit pressure setting unit 220, and a pulsation waveform computation unit 230.

The stack withstand pressure constant storage unit 211 stores, as a stack withstand pressure constant for preventing an excessive pressure of anode gas, an upper limit of the withstand pressure of the anode gas flow passages 24 formed in the fuel cell stack 110.

Upon obtaining the detected value from the atmospheric pressure sensor 12, the stack withstand pressure limit calculation unit 212 adds the stack withstand pressure constant to the detected value of the atmospheric pressure, and outputs the resultant sum as a stack withstand pressure limit (limit pressure) to the pulsation upper limit pressure setting unit 210.

The interelectrode withstand pressure constant storage unit 213 stores an upper limit of the withstand pressure of the membrane electrode assemblies 11, each of which is interposed between the anode gas flow passages 24 and the cathode gas flow passages 34, as an interelectrode withstand pressure constant (allowable pressure) for preventing deterioration in the electric power generation performance of the membrane electrode assemblies 11.

The membrane withstand pressure limit calculation unit 214 adds the interelectrode withstand pressure constant to the stack inlet cathode pressure obtained from the cathode pressure sensor 124, and outputs the resultant sum as a membrane withstand pressure limit to the pulsation upper limit pressure setting unit 210.

On the basis of the target current, the target pulsation amplitude computation unit 215 computes a target value of a pulsation amplitude with which the pressure of anode gas is pulsated (hereinafter "target pulsation amplitude").

In the present embodiment, a target pulsation amplitude map showing correspondence between target currents and target pulsation amplitudes is recorded in the target pulsation amplitude computation unit 215. Upon obtaining the target current from the target current computation unit 151, the target pulsation amplitude computation unit 215 refers to the target pulsation amplitude map and computes a target pulsation amplitude corresponding to the obtained target current.

Specifically, the target pulsation amplitude computation unit 215 makes the target pulsation amplitude larger for a larger target current. This is because a larger target current makes it easier for impurity gases to accumulate in the anode gas flow passages 24. The target pulsation amplitude computation unit 215 outputs the target pulsation amplitude to the upper limit pressure target value calculation unit 216.

The upper limit pressure target value calculation unit 216 adds a pulsation lower limit pressure based on the cathode pressure and the target pulsation amplitude, and outputs the resultant sum as a target pulsation upper limit pressure to the pulsation upper limit pressure setting unit 210.

The pulsation upper limit pressure setting unit 210 selects the smallest one of calculated values of the stack withstand pressure limit, the membrane withstand pressure limit, and the target pulsation upper limit pressure, and sets the selected value as a pulsation upper limit pressure in the pulsation waveform computation unit 230.

The hydrogen partial pressure maintenance control unit 300 increases the pressure of anode gas supplied to the fuel cell stack 110 in accordance with the conditions of partial pressures of impurities within the fuel cell stack 110. For example, the hydrogen partial pressure maintenance control unit 300 increases the pressure of anode gas in accordance with the temperature of the fuel cell stack 110.

In the present embodiment, the hydrogen partial pressure maintenance control unit 300 computes a lower limit of the pressure of anode gas necessary for securing a partial pressure of hydrogen within the anode gas flow passages 24 (hereinafter "required hydrogen partial pressure lower limit") with the use of the detected values of the atmospheric pressure, the stack inlet water temperature, and the stack outlet water temperature.

In the fuel cell stack 110, partial pressures of impurity gases, such as nitrogen and water vapor, increase with an increase in the stack temperature in electric power generation regions of the membrane electrode assemblies 11 where the anode gas flow passages 24 are formed. In particular, with an increase in the stack temperature, water in a liquid state transforms into water vapor, the amount of water vapor increases, and a partial pressure of a corresponding impurity gas increases. This leads to a relative decrease in a partial pressure of hydrogen within the anode gas flow passages 24, and hence a decrease in the concentration of hydrogen in the electric power generation regions. As a measure against this issue, the pressure of anode gas can be increased in response to an increase in partial pressures of impurity gases by estimating the required hydrogen partial pressure lower limit using the above-described detected values that have correlations with the conditions of impurity gases.

The hydrogen partial pressure maintenance control unit 300 outputs the required hydrogen partial pressure lower limit to the pulsation lower limit pressure setting unit 220. A configuration of the hydrogen partial pressure maintenance control unit 300 will be described later with reference to FIG. 7.

The pulsation lower limit pressure setting unit 220 selects a larger one of the detected value of the stack inlet cathode pressure and the value of the required hydrogen partial pressure lower limit, and sets the selected value as a pulsation lower limit pressure in the pulsation waveform computation unit 230. That is to say, the pulsation lower limit pressure setting unit 220 makes the pulsation lower limit pressure higher than the pressure of cathode gas within the fuel cell stack 110 in accordance with the conditions of partial pressures of impurity gases.

The pulsation waveform computation unit 230 sets the target anode gas pressure on the basis of the pulsation upper limit pressure, the pulsation lower limit pressure, and the stack inlet anode pressure.

The pulsation waveform computation unit 230 sets the pulsation upper limit pressure as the target anode gas pressure. Once the stack inlet anode pressure has increased to the pulsation upper limit pressure, the pulsation waveform computation unit 230 sets the pulsation lower limit pressure as the target anode gas pressure. Then, after the stack inlet anode pressure has decreased to the pulsation lower limit pressure, the pulsation waveform computation unit 230 sets the pulsation upper limit pressure as the target anode gas pressure again. In the above-described manner, the pulsation waveform computation unit 230 alternately sets the pulsation upper limit pressure and the pulsation lower limit pressure as the target anode gas pressure, so that the pressure of anode gas supplied to the fuel cell stack 110 pulsates.

Figure 7:
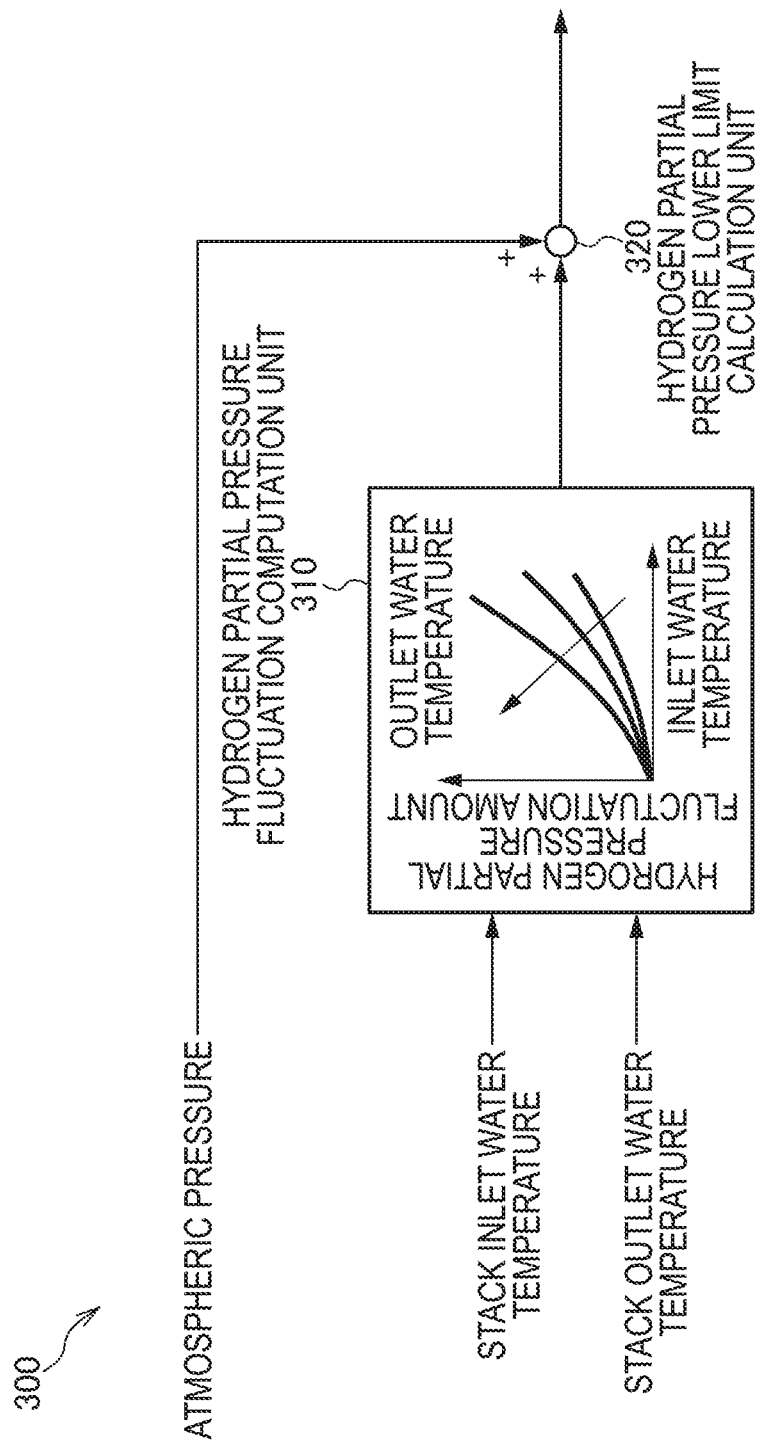
FIG. 7 is a block diagram showing a configuration of a hydrogen partial pressure maintenance control unit.

FIG. 7 is a block diagram showing a detailed configuration of the hydrogen partial pressure maintenance control unit 300.

The hydrogen partial pressure maintenance control unit 300 includes a hydrogen partial pressure fluctuation computation unit 310 and a hydrogen partial pressure lower limit calculation unit 320.

The hydrogen partial pressure fluctuation computation unit 310 computes the amount of fluctuation in a partial pressure of hydrogen (hereinafter "partial pressure fluctuation amount") on the basis of the stack inlet water temperature and the stack outlet water temperature.

In the present embodiment, partial pressure fluctuation maps are recorded, in one-to-one correspondence with stack outlet water temperatures, in the hydrogen partial pressure fluctuation computation unit 310. Each partial pressure fluctuation map shows correspondence between stack inlet water temperatures and partial pressure fluctuation amounts. Upon obtaining the detected values of the stack outlet water temperature and the stack inlet water temperature, the hydrogen partial pressure fluctuation computation unit 310 refers to a partial pressure fluctuation map identified by the stack inlet water temperature, and outputs a partial pressure fluctuation amount corresponding to the stack inlet water temperature to the hydrogen partial pressure lower limit calculation unit 320.

Specifically, the hydrogen partial pressure fluctuation computation unit 310 makes the partial pressure fluctuation amount larger for a higher stack inlet water temperature. This is because a higher stack inlet water temperature leads to higher partial pressures of nitrogen and water vapor. In addition, given the same stack inlet water temperature, the hydrogen partial pressure fluctuation computation unit 310 makes the partial pressure fluctuation amount larger for a higher stack outlet water temperature. This is because a higher stack outlet water temperature leads to a higher average temperature within the anode gas flow passages 24 (average of the stack inlet water temperature and the stack outlet water temperature), hence a higher partial pressure of water vapor.

The hydrogen partial pressure lower limit calculation unit 320 adds the detected value of the atmospheric pressure to the partial pressure fluctuation amount, and outputs the resultant sum as the required hydrogen partial pressure lower limit.

As described above, the anode gas control unit 154 performs a pulsation operation of causing the pressure of anode gas to pulsate with a desired pulsation amplitude corresponding to an operating condition of the fuel cell stack 110. The pulsation lower limit pressure is set to the same value as the stack inlet cathode pressure for the purpose of preventing deterioration in the electrolyte membranes caused by an interelectrode pressure difference between the pressure of anode gas and the pressure of cathode gas. The pulsation upper limit pressure is set to a sum of the pulsation lower limit pressure and the pulsation amplitude, using the stack inlet cathode pressure as a reference.

In a pulsation operation for the pressure of anode gas, if the stack temperature increases due to an increase in electric power that is required to be generated by the fuel cell stack 110 during, for example, a high-load operation, then a partial pressure of an impurity gas, especially water vapor, in the anode gas flow passages 24 increases. This results in a relative decrease in a partial pressure of hydrogen within anode gas.

In order to prevent the relative decrease in the partial pressure of hydrogen, the pulsation lower limit pressure is increased in accordance with a range of increase in the partial pressure of water vapor within the fuel cell stack 110, and when the value of the pulsation lower limit pressure exceeds the cathode pressure, the pulsation lower limit pressure is made higher than the cathode pressure. In this way, the partial pressure of hydrogen within the fuel cell stack 110 is secured, thereby preventing poor electric power generation caused by shortage of hydrogen. By increasing the pulsation upper limit pressure with an increase in the pulsation lower limit pressure, the pulsation amplitude of the pressure of anode gas can be secured.

However, when the pulsation upper limit pressure is increased with an increase in the partial pressure of water vapor within the fuel cell stack 110, there are cases where the pulsation upper limit pressure is suppressed so as not to exceed an allowable pressure difference (interelectrode withstand pressure) in the electrolyte membranes. In such cases, the pulsation amplitude is reduced, the performance of discharge of impurities within the fuel cell stack 110 is lowered, and thus the efficiency of electric power generation by the fuel cell stack 110 drops.

If the pulsation lower limit pressure is reduced without increasing the pulsation upper limit pressure in order to secure the performance of discharge of impurities, the pulsation amplitude can be secured, but it is difficult to secure the required electric power necessary for the loads, including the driving motor, because the overall pressure of anode gas decreases.

In view of this, the present embodiment increases the pulsation upper limit pressure of anode gas in response to an increase in a required partial pressure of hydrogen within the fuel cell stack 110, and also increases the pressure of cathode gas so as not to exceed the interelectrode withstand pressure of the electrolyte membranes. In this way, the required partial pressure of hydrogen can be ensured while alleviating a restriction on the pulsation upper limit pressure of anode gas. Therefore, not only the pulsation amplitude of anode gas, but also the required electric power can be secured.

Figure 8:
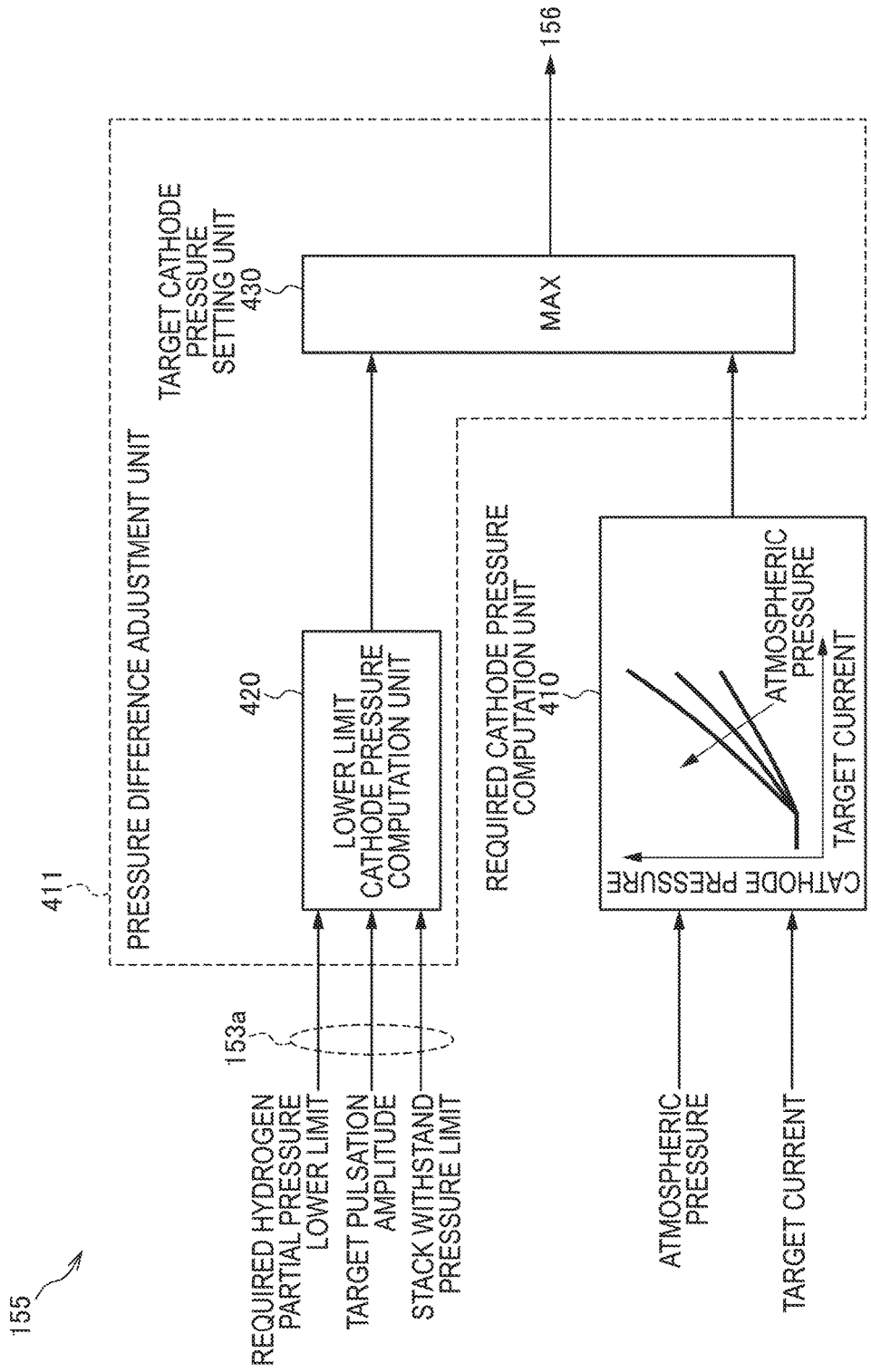
FIG. 8 is a block diagram showing a configuration of a target cathode pressure computation unit.

FIG. 8 is a block diagram showing a configuration of the target cathode pressure computation unit 155 according to the embodiment of the present invention.

The target cathode pressure computation unit 155 includes a required cathode pressure computation unit 410 and a pressure difference adjustment unit 411.

In order to secure the required electric power, the required cathode pressure computation unit 410 computes a value of the minimum pressure of cathode gas that is required for the fuel cell stack 110 to generate electric power (hereinafter "required cathode pressure"), on the basis of the target current. The required cathode pressure computation unit 410 makes the required cathode pressure higher for a larger target current.

The required cathode pressure computation unit 410 corrects the required cathode pressure in accordance with the detected value of the atmospheric pressure. A decrease in the atmospheric pressure leads to an increase in the pressure ratio of the required cathode pressure—i.e., the pressure ratio of the cathode compressor 122—to the atmospheric pressure, and hence an increase in power required by the cathode compressor 122 and a drop in the system efficiency. As a measure against this issue, the required cathode pressure computation unit 410 corrects the required cathode pressure in such a manner that the lower the atmospheric pressure, the smaller the value of the required cathode pressure.

In the present embodiment, electric power requirement maps are recorded in advance, in one-to-one correspondence with atmospheric pressures, in the required cathode pressure computation unit 410. Each electric power requirement map shows correspondence between currents of generated electric power and required cathode pressures. Upon obtaining the detected value of the atmospheric pressure and the target current, the required cathode pressure computation unit 410 refers to an electric power requirement map identified by the detected value of the atmospheric pressure, and outputs a required cathode pressure corresponding to the target current to a target cathode pressure setting unit 430.

When a value set as the pulsation upper limit pressure exceeds the stack withstand pressure limit, the pressure difference adjustment unit 411 sets the target cathode gas pressure to be higher than the required cathode pressure by the amount of excess. If the interelectrode pressure difference between the pulsation upper limit pressure of anode gas and the required cathode pressure exceeds the interelectrode withstand pressure constant of the membrane electrode assemblies 11, the pressure difference adjustment unit 411 increases the target cathode gas pressure by the amount of excess.

The pressure difference adjustment unit 411 includes a lower limit cathode pressure computation unit 420 and the target cathode pressure setting unit 430.

The lower limit cathode pressure computation unit 420 computes a lower limit of the pressure of cathode gas (hereinafter "lower limit cathode pressure" so as not to exceed the interelectrode withstand pressure of the electrolyte membranes.

The lower limit cathode pressure computation unit 420 obtains the required hydrogen partial pressure lower limit, the target pulsation amplitude, and the stack withstand pressure limit as the information related to the pressure of anode gas, which has been described with reference to FIG. 5. The lower limit cathode pressure computation unit 420 then obtains the lower limit cathode pressure using these values, and outputs the lower limit cathode pressure to the target cathode pressure setting unit 430. Note that the details of the lower limit cathode pressure computation unit 420 will be described later with reference to FIG. 9.

The target cathode pressure setting unit 430 selects a larger one of values of the required cathode pressure and the lower limit cathode pressure, and sets the selected value as the target cathode gas pressure.

Figure 9:
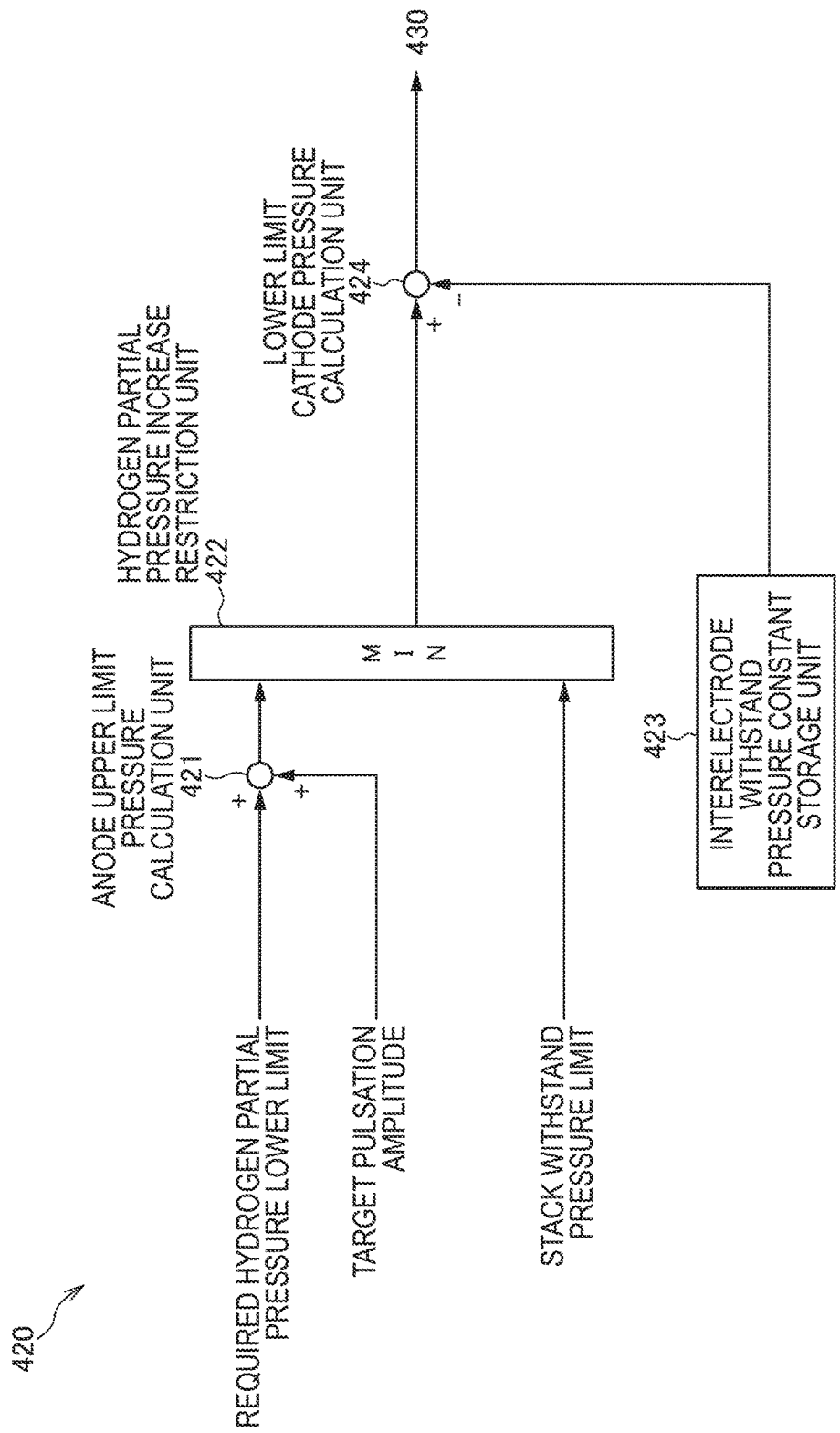
FIG. 9 is a block diagram showing a configuration of a lower limit cathode pressure computation unit.

FIG. 9 is a block diagram showing a functional configuration of the lower limit cathode pressure computation unit 420.

The lower limit cathode pressure computation unit 420 includes an anode upper limit pressure calculation unit 421, a hydrogen partial pressure increase restriction unit 422, an interelectrode withstand pressure constant storage unit 423, and a lower limit cathode pressure calculation unit 424. Note that the interelectrode withstand pressure constant storage unit 423 is the same as the interelectrode withstand pressure constant storage unit 213 shown in FIG. 6.

The anode upper limit pressure calculation unit 421 adds the required hydrogen partial pressure lower limit and the target pulsation amplitude, and outputs the resultant sum as an anode upper limit pressure to the hydrogen partial pressure increase restriction unit 422.

The hydrogen partial pressure increase restriction unit 422 selects a smaller one of values of the anode upper limit pressure and the stack withstand pressure limit, and outputs the selected value as an upper limit anode pressure to the lower limit cathode pressure calculation unit 424.

The lower limit cathode pressure calculation unit 424 subtracts the interelectrode withstand pressure constant from the upper limit anode pressure, and outputs the resultant difference as the lower limit cathode pressure.

In the above-described manner, when the interelectrode pressure difference between the required cathode pressure and the pulsation upper limit pressure exceeds the allowable pressure, the target cathode pressure computation unit 155 makes the target cathode gas pressure higher for a higher pulsation upper limit pressure so that the interelectrode pressure difference does not exceed the allowable pressure.

Specifically, in a case where the target anode pressure computation unit 153 increases the target anode gas pressure to secure the required partial pressure of hydrogen, the required hydrogen partial pressure lower limit provided to the lower limit cathode pressure computation unit 420 is large. This leads to an increase in the value calculated by the anode upper limit pressure calculation unit 421, i.e., the anode upper limit pressure.

In a case where the anode upper limit pressure is lower than the stack withstand pressure limit, if the lower limit cathode pressure obtained by subtracting the interelectrode withstand pressure constant from the anode upper limit pressure exceeds the required cathode pressure, then the target cathode pressure setting unit 430 sets the lower limit cathode pressure as the target cathode gas pressure.

In the above-described manner, in response to an increase in the pulsation upper limit pressure caused by an increase in the required partial pressure of hydrogen, the pressure of cathode gas increases so that the interelectrode pressure difference does not exceed the interelectrode withstand pressure of the membrane electrode assemblies 11.

Furthermore, in a case where the pulsation upper limit pressure is restricted by the stack withstand pressure limit in the target anode pressure computation unit 153, the anode upper limit pressure is restricted by the stack withstand pressure limit in the hydrogen partial pressure increase restriction unit 422, as in the target anode pressure computation unit 153. In this way, an increase in the pressure of cathode gas can be stopped as soon as an increase in the pressure of anode gas is stopped by the stack withstand pressure limit.

This makes it possible to prevent the pressure of cathode gas from increasing beyond necessity in the target cathode pressure computation unit 155 in a case where an increase in the pressure of anode gas is restricted in the target anode pressure computation unit 153. Therefore, consumption of electric power by the cathode compressor 122 can be reduced.

A description is now given of operations performed by the fuel cell system 100 under control by the controller 150.

FIGS. 10A to 10D show an example of an operating condition of the fuel cell stack 110 in accordance with a fluctuation in the required partial pressure of hydrogen.

Figure 10:
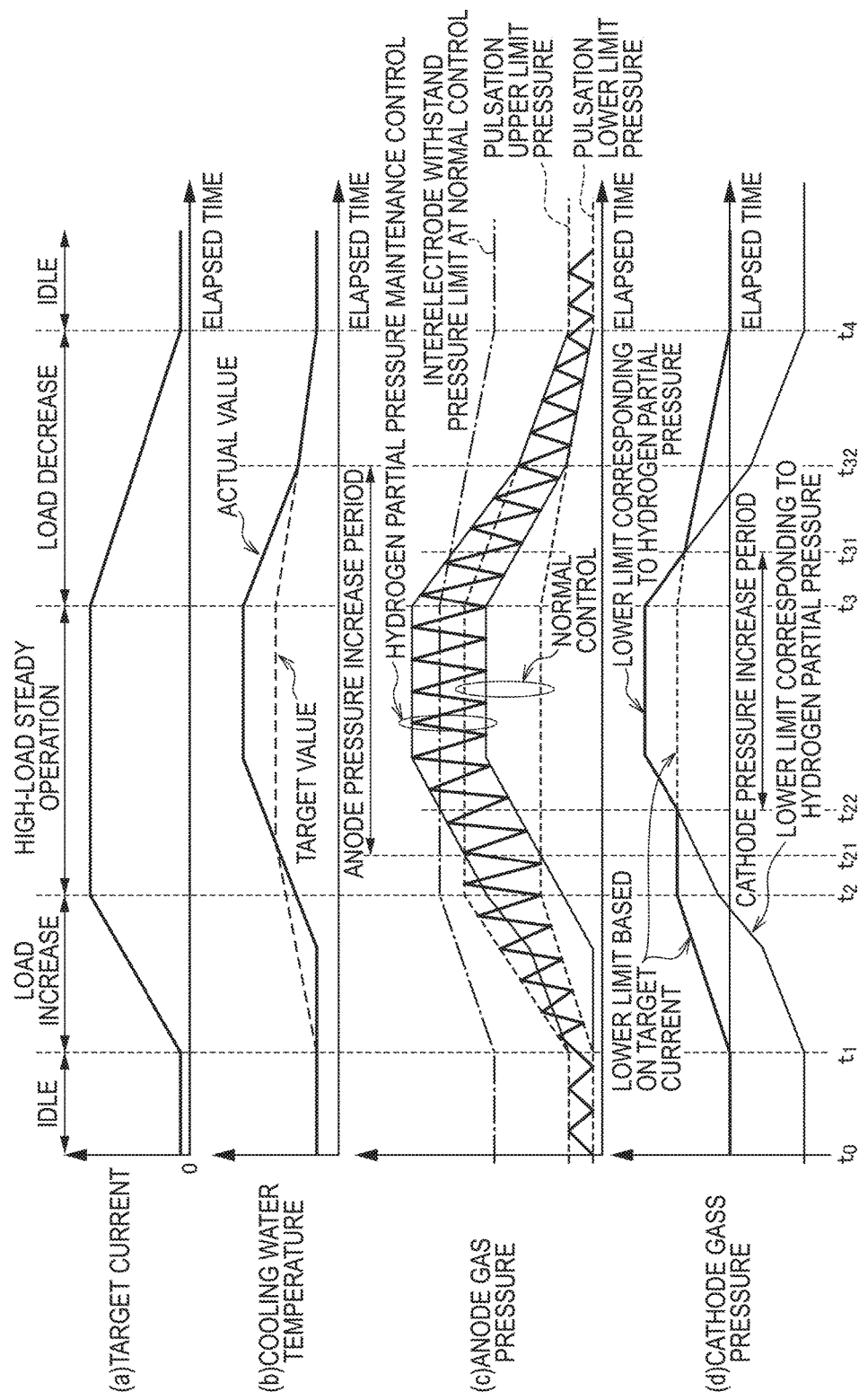
FIGS. 10A to 10D are timing charts showing how the pressure of cathode gas is controlled with a fluctuation in a partial pressure of hydrogen.

FIG. 10A shows the target current calculated by the target current computation unit 151. FIG. 10B shows the cooling water temperature. In FIG. 10B, a detected value of the cooling water temperature is indicated by a solid line, whereas a target value of the cooling water temperature is indicated by a dash line.

FIG. 10C shows the pulsating pressure of anode gas supplied to the fuel cell stack 110. In FIG. 10C, the pulsation lower limit pressure and the pulsation upper limit pressure for securing the partial pressure of hydrogen are indicated by solid lines, whereas the pulsation lower limit pressure and the pulsation upper limit pressure corresponding to a case where the cathode pressure is set as the pulsation lower limit pressure are indicated by dash lines.

FIG. 10D shows the pressure of cathode gas supplied to the fuel cell stack 110. In FIG. 10D, a lower limit based on the target current (required cathode pressure) and a lower limit corresponding to the required partial pressure of hydrogen (lower limit cathode pressure) are illustrated. Horizontal axes in FIGS. 10A to 10D represent a common time axis.

In an idle period from time t0 to time t1, the vehicle is in an idle state, and an accelerator depression amount is zero. Thus, the fuel cell stack 110 supplies no electric power to the driving motor, and electric power generated by the fuel cell stack 110 is supplied only to the auxiliary devices, such as the cathode compressor 122 and the cooling water pump 143. Accordingly, the target current is calculated on the basis of the electric power required by the auxiliary machines.

During the idle period, the fuel cell stack 110 is required to generate small electric power, and thus the values of the target current, the cooling water temperature, the pulsation upper limit pressure and the pulsation lower limit pressure of anode gas, and the pressure of cathode gas are smaller than those during running of the vehicle, as shown in FIGS. 10A to 10D.

In a load increase period from time t1 to time t2, the accelerator depression amount increases to accelerate the vehicle, and the electric power required by the driving motor increases. Consequently, as shown in FIG. 10A, the target current gradually increases. This leads to an increase in the pulsation amplitude as shown in FIG. 10C.

Furthermore, as the actual value (detected value) of the cooling water temperature is smaller than the target value of the cooling water temperature as shown in FIG. 10B, the pulsation operation for the pressure of anode gas is performed under normal control based on the target current as shown in FIG. 10C. That is to say, the pulsation lower limit pressure setting unit 220 shown in FIG. 6 selects the stack inlet cathode pressure, and the pulsation lower limit pressure and the pulsation upper limit pressure are set using the stack inlet cathode pressure as a reference.

In a high-load steady operation period from time t2 to time t3, the accelerator depression amount is maintained constant, and thus the target current is maintained constant as shown in FIG. 10A. Accordingly, as shown in FIG. 10C, the pulsation amplitude is maintained constant as well.

Past time t21, the actual value of the cooling water temperature exceeds the target value of the cooling water temperature, and hence the pulsation lower limit pressure setting unit 220 switches the reference for the pulsation lower limit pressure from the stack inlet cathode pressure to the required hydrogen partial pressure lower limit. Consequently, as shown in FIG. 10C, the pulsation operation for anode gas makes a transition from normal control to hydrogen partial pressure maintenance control.

Past time t22, the pressure of anode gas increases in response to an increase in the required partial pressure of hydrogen as shown in FIG. 10C. Consequently, as shown in FIG. 10D, the lower limit of the pressure of cathode gas corresponding to the partial pressure of hydrogen exceeds the lower limit of the pressure of cathode gas based on the target current. Therefore, the target cathode pressure setting unit 430 switches the target cathode pressure from the lower limit based on the target current to the lower limit corresponding to the partial pressure of hydrogen.

In the above-described manner, by making the pressure of cathode gas higher than the lower limit based on the target current with an increase in the required partial pressure of hydrogen, both of the pulsation upper limit pressure and the pulsation lower limit pressure can be increased while maintaining the pressure difference between the pressure of cathode gas and the pulsation upper limit pressure at or below the interelectrode withstand pressure of the electrolyte membranes. Therefore, the pulsating pressure can be increased in response to an increase in the required partial pressure of hydrogen without restricting the pulsation amplitude to secure the interelectrode withstand pressure.

In a load decrease period from time t3 to time t4, the accelerator depression amount is reduced to zero, and the target current decreases mildly as shown in FIG. 10A. This leads to a decrease in the pulsation amplitude as shown in FIG. 10C.

Furthermore, with the decrease in the target current, the cooling water temperature decreases as shown in FIG. 10B. Consequently, the pulsation lower limit pressure and the pulsation upper limit pressure decrease under the hydrogen partial pressure maintenance control as shown in FIG. 10C, and the lower limit corresponding to the partial pressure of hydrogen decreases as well as shown in FIG. 10D.

Past time t31, the lower limit corresponding to the partial pressure of hydrogen falls below the lower limit based on the target current as shown in FIG. 10C. Thus, the target cathode pressure setting unit 430 switches the target cathode gas pressure to the lower limit based on the target current.

Then, at time t32, the actual value of the cooling water temperature matches the target value of the cooling water temperature, and the pulsation operation for anode gas makes a transition from the hydrogen partial pressure maintenance control to the normal control as shown in FIG. 10C. Thereafter, at time t4, the accelerator depression amount reaches zero, and the vehicle is in the idle state.

In the above-described manner, with an increase in the cooling water temperature, the pressure of cathode gas is increased in response to an increase in the required partial pressure of hydrogen in an anode pressure increase period. In this way, in a cathode pressure increase period, the overall pressure of anode gas can be increased without the pulsation upper limit pressure being suppressed due to the interelectrode withstand pressure of the electrolyte membranes.

According to an aspect of the embodiment of the present invention, the target cathode pressure computation unit 155 controls the pressure of cathode gas on the basis of the electric power required by the loads connected to the fuel cell stack 110. Also, the pulsation control unit 200 causes the pressure of anode gas to pulsate on the basis of the pulsation amplitude necessary for discharge of impurities retained in the anode gas flow passages 24 and the detected value of the cathode pressure. Furthermore, the hydrogen partial pressure maintenance control unit 300 increases the pressure of anode gas in accordance with a condition of a fluctuation in partial pressures of impurities within the fuel cell stack 110.

The target cathode pressure computation unit 155 increases the target cathode gas pressure when the interelectrode pressure difference between the pulsation upper limit pressure of anode gas and the pressure of cathode gas exceeds the interelectrode withstand pressure constant (allowable pressure) that is set to protect the electrolyte membranes.

That is to say, the cathode gas control unit 156 makes the pressure of cathode gas higher when the interelectrode pressure difference between the pressure of anode gas and the pressure of cathode gas is large than when the interelectrode pressure difference is small.

Thus, when the pressure of anode gas is increased in response to an increase in partial pressures of impurity gases within the fuel cell stack 110, the target cathode pressure computation unit 155 increases the target cathode gas pressure so that the interelectrode pressure difference does not exceed the allowable pressure of the electrolyte membranes.

In this way, the overall pressure of anode gas can be increased without restricting the pulsation upper limit pressure with the withstand pressure limit of the electrolyte membranes. Therefore, not only the pulsation amplitude of the pressure of anode gas, but also the required electric power based on the loads can be secured.

In the present embodiment, the hydrogen partial pressure maintenance control unit 300 calculates the required hydrogen partial pressure lower limit (a lower limit pressure of anode gas for securing the partial pressure of hydrogen) on the basis of the conditions of impurities within the fuel cell stack 110. The pulsation lower limit pressure setting unit 220 sets a pressure value of a larger one of the required hydrogen partial pressure lower limit and the detected value of the cathode pressure as the pulsation lower limit pressure.

The pulsation upper limit pressure setting unit 210 sets a sum of the pulsation lower limit pressure and the pulsation amplitude as the pulsation upper limit pressure of anode gas. The pulsation waveform computation unit 230 causes the pressure of anode gas to pulsate on the basis of the pulsation upper limit pressure and the pulsation lower limit pressure.

In the target cathode pressure computation unit 155, the required cathode pressure computation unit 410 computes the required cathode pressure (required pressure of cathode gas) on the basis of the target current. When the interelectrode pressure difference obtained by subtracting the required cathode pressure from the pulsation upper limit pressure exceeds the allowable pressure, the pressure difference adjustment unit 411 makes the target cathode gas pressure higher than the required cathode pressure on the basis of the difference between the interelectrode pressure difference and the allowable pressure.

In the above-described manner, the present embodiment sets the pulsation lower limit pressure on the basis of the detected value of the cathode pressure, and sets the pulsation upper limit pressure on the basis of the pulsation lower limit pressure. In this case, when the pulsation lower limit pressure is increased in accordance with the required hydrogen partial pressure lower limit, the pressure of cathode gas is increased using the required hydrogen partial pressure lower limit, so that the pulsation lower limit pressure does not exceed the interelectrode withstand pressure of the electrolyte membranes. In this way, not only the pulsation amplitude of anode gas, but also the required electric power can be secured.

Although the present embodiment has described an example in which the pulsation lower limit pressure of anode gas is set on the basis of the detected value of the cathode pressure, the present embodiment is not limited to this example. For example, a target pressure of anode gas may be calculated on the basis of the target current, and the pulsation upper limit pressure and the pulsation lower limit pressure may be calculated using the target pressure as a reference. In this case also, similar effects can be achieved.

In the present embodiment, the hydrogen partial pressure increase restriction unit 422 stops an increase in the pressure of cathode gas supplied to the fuel cell stack 110 as soon as the pulsation upper limit pressure is restricted by the limit pressure (stack withstand pressure limit) for preventing an excessive pressure of anode gas. This can prevent an unnecessary increase in the pressure of cathode gas while the pulsation upper limit pressure is being restricted.

In the pressure difference adjustment unit 411, the lower limit cathode pressure calculation unit 424 calculates the lower limit cathode pressure by subtracting the interelectrode withstand pressure constant from a pressure value of a smaller one of the anode upper limit pressure and the stack withstand pressure limit. Then, the target cathode pressure setting unit 430 sets a higher one of the lower limit cathode pressure and the required cathode pressure as the target cathode gas pressure.

In this way, when the pulsation upper limit pressure has increased with an increase in the partial pressures of impurity gases, the target cathode gas pressure can be made higher than the requested cathode pressure so as not to exceed the stack withstand pressure and the interelectrode withstand pressure.

Note that in calculation of the lower limit cathode pressure, the pressure difference adjustment unit 411 may compute the required hydrogen partial pressure lower limit (lower limit pressure) on the basis of the temperature of the fuel cell stack 110, and calculate the anode upper limit pressure by adding the target pulsation amplitude to the result of computation.

In this way, the pressure difference adjustment unit 411 can calculate the pulsation upper limit pressure of anode gas in response to an increase in the required partial pressure of hydrogen. Although the cooling water temperature is used as the temperature of the fuel cell stack 110 in the present embodiment, a value detected by a temperature sensor provided inside the fuel cell stack 110 may be used as the temperature of the fuel cell stack 110.

In the present embodiment, the pulsation upper limit pressure setting unit 210 makes the pulsation upper limit pressure of anode gas higher for a higher temperature of the fuel cell stack 110. In this case, the pressure difference adjustment unit 411 makes the target cathode gas pressure higher for a higher pulsation upper limit pressure only when the interelectrode pressure difference between the pulsation upper limit pressure and the required cathode pressure exceeds the allowable pressure.

Therefore, the target cathode gas pressure can be increased in response to an increase in the pulsation upper limit pressure relative to the allowable pressure difference. This can avoid setting of the target cathode gas pressure to an unnecessarily high pressure, thereby suppressing consumption of electric power by the cathode compressor 122.

Although the embodiment of the present invention has been described thus far, the above embodiment merely illustrates a part of example applications of the present invention, and specific configurations of the above embodiment are not intended to limit a technical scope of the present invention.

For example, when the pulsation amplitude decreases as a result of restricting the pulsation upper limit pressure to the anode withstand pressure limit after the pressure of cathode gas is made higher than the required cathode pressure, the target current may be reduced in accordance with the pressure difference between the value set as the pulsation upper limit pressure and the withstand pressure limit.

Furthermore, when the pressure difference between the value set as the pulsation upper limit pressure and the detected value of the cathode pressure exceeds the allowable pressure, the pressure difference adjustment unit 411 may set the target anode gas pressure to be higher by the amount of excess above the allowable pressure.

Note that the foregoing embodiment can be implemented in combinations as appropriate.

The present application claims a priority based on Japanese Patent Application No. 2013-142101 filed with the Japan Patent Office on Jul. 5, 2013, the entire contents of which are incorporated into the present specification by reference.

The invention claimed is:

1. A fuel cell system for supplying anode gas and cathode gas to a fuel cell and for generating electric power in accordance with a load, the fuel cell system comprising a controller programmed to:
   calculate a lower limit partial pressure of the anode gas on the basis of a condition of an impurity within the fuel cell;
   set a higher one of the lower limit partial pressure of the anode gas and pressure of the cathode gas as a pulsation lower limit pressure of the anode gas;
   set a pressure obtained by adding the pulsation lower limit pressure and a pulsation amplitude as a pulsation upper limit pressure of the anode gas;
   increase the pulsation upper limit pressure and the pulsation lower limit pressure of the anode gas in response to an increase in a partial pressure of the impurity;
   cause a pressure of the anode gas to pulsate between the pulsation upper limit pressure and the pulsation lower limit pressure;
   compute a required pressure of the cathode gas on the basis of the load; and
   set a target pressure of the cathode gas higher than the required pressure of the cathode gas on the basis of the pulsation upper limit pressure when a pressure difference between the pulsation upper limit pressure of the anode gas and the required pressure of the cathode gas exceeds an allowable pressure for protecting the fuel cell.

2. A method of controlling a fuel cell system for supplying anode gas and cathode gas to a fuel cell and for generating electric power in accordance with a load, the method comprising:
   calculating a lower limit partial pressure of the anode gas on the basis of a condition of an impurity within the fuel cell;
   setting a higher one of the lower limit partial pressure of the anode gas and pressure of the cathode gas as a pulsation lower limit pressure of the anode gas;
   setting a pressure obtained by adding the pulsation lower limit pressure and a pulsation amplitude as a pulsation upper limit pressure of the anode gas;
   increasing the pulsation upper limit pressure and the pulsation lower limit pressure of the anode gas in response to an increase in a partial pressure of the impurity;
   causing a pressure of the anode gas to pulsate between the pulsation upper limit pressure and the pulsation lower limit pressure;
   computing a required pressure of the cathode gas on the basis of the load; and
   setting a target pressure of the cathode gas higher than the required pressure of the cathode gas on the basis of the pulsation upper limit pressure when a pressure difference between the pulsation upper limit pressure of the anode gas and the required pressure of the cathode gas exceeds an allowable pressure for protecting the fuel cell.

3. A fuel cell system for supplying anode gas and cathode gas to a fuel cell and for generating electric power in accordance with a load, the fuel cell system comprising a controller programmed to:
   control a pressure of the cathode gas on the basis of the load;
   cause a pressure of the anode gas to pulsate between an upper limit pressure and a lower limit pressure determined on the basis of the pressure of the cathode gas and an operating condition of the fuel cell;
   increase the pressure of the anode gas in accordance with a condition of an impurity within the fuel cell;
   set a target pressure of the cathode gas on the basis of the upper limit pressure of the anode gas when a pressure difference between the pressure of the anode gas and the pressure of the cathode gas has increased by controlling the pressure of the anode gas so as to be increased;
   increase a pulsation upper limit pressure and a pulsation lower limit pressure of the anode gas in response to an increase in a partial pressure of the impurity within the fuel cell, the pulsation upper limit pressure and the pulsation lower limit pressure being set as the upper limit pressure and the lower limit pressure, respectively;
   increase the target pressure of the cathode gas so that the pressure difference does not exceed an allowable pressure for protecting the fuel cell when the pulsation upper limit pressure is increased;
   calculate a lower limit partial pressure of the anode gas on the basis of the condition of the impurity within the fuel cell;
   set a higher one of the lower limit partial pressure of the anode gas or the pressure of the cathode gas as the pulsation lower limit pressure of the anode gas;
   set a pressure obtained by adding the pulsation lower limit pressure and a pulsation amplitude as the pulsation upper limit pressure of the anode gas;
   cause the pressure of the anode gas to pulsate on the basis of the pulsation upper limit pressure and the pulsation lower limit pressure;
   compute a required pressure of the cathode gas on the basis of the load; and
   make the target pressure of the cathode gas higher than the required pressure of the cathode gas on the basis of the pulsation upper limit pressure when a pressure difference between the pulsation upper limit pressure of the anode gas and the required pressure of the cathode gas exceeds the allowable pressure.

4. The fuel cell system according to claim 3, wherein the controller is further programmed to:
   stop an increase in the target pressure of the cathode gas when the pulsation upper limit pressure exceeds a limit pressure for preventing an excessive pressure of the anode gas.

5. The fuel cell system according to claim 4, wherein the controller is further programmed to:

make the target pressure of the cathode gas higher than the required pressure by a difference obtained by subtracting the limit pressure from the pulsation upper limit pressure.

6. The fuel cell system according to claim 4, wherein the controller is further programmed to:
make the target pressure of the cathode gas higher than the required pressure by a difference obtained by subtracting the allowable pressure from the pressure difference.

7. The fuel cell system according to claim 3, wherein
the impurity is water vapor produced through generation of the electric power, and
the controller is further programmed to calculate the lower limit pressure of the anode gas on the basis of a temperature of the fuel cell, and calculate the pulsation upper limit pressure of the anode gas by adding the lower limit pressure to the pulsation amplitude.

8. The fuel cell system according to claim 3, wherein the controller is further programmed to:
calculate a lower limit pressure of the cathode gas by subtracting the allowable pressure from a lower one of the pressure of the anode gas and a limit pressure for preventing an excessive pressure of the anode gas, and
set a higher one of the lower limit pressure of the cathode gas and the required pressure as the target pressure of the cathode gas.

9. The fuel cell system according to claim 3, wherein the controller is further programmed to:
make the pulsation upper limit pressure of the anode gas higher for a higher temperature of the fuel cell, and
make the target pressure of the cathode gas higher for a higher pulsation upper limit pressure of the anode gas when the pressure difference exceeds the allowable pressure.

10. The fuel cell system according to claim 1, wherein the controller is further programmed to:
stop an increase in the target pressure of the cathode gas when the pulsation upper limit pressure exceeds a limit pressure for preventing an excessive pressure of the anode gas.

11. The fuel cell system according to claim 10, wherein the controller is further programmed to:
make the target pressure of the cathode gas higher than the required pressure by a difference obtained by subtracting the limit pressure from the pulsation upper limit pressure.

12. The fuel cell system according to claim 1, wherein the controller is further programmed to:
make the target pressure of the cathode gas higher than the required pressure by a difference obtained by subtracting the allowable pressure from the pressure difference.

13. The fuel cell system according to claim 1, wherein
the impurity is water vapor produced through generation of the electric power, and
the controller is further programmed to calculate the pulsation lower limit pressure of the anode gas on the basis of a temperature of the fuel cell, and calculate the pulsation upper limit pressure of the anode gas by adding the pulsation lower limit pressure to the pulsation amplitude.

14. The fuel cell system according to claim 1, wherein the controller is further programmed to:
calculate a lower limit pressure of the cathode gas by subtracting the allowable pressure from a lower one of the pressure of the anode gas and a limit pressure for preventing an excessive pressure of the anode gas, and
set a higher one of the lower limit pressure of the cathode gas and the required pressure as the target pressure of the cathode gas.

15. The fuel cell system according to claim 1, wherein the controller is further programmed to:
make the pulsation upper limit pressure of the anode gas higher for a higher temperature of the fuel cell, and
make the target pressure of the cathode gas higher for a higher pulsation upper limit pressure of the anode gas when the pressure difference exceeds the allowable pressure.

* * * * *